United States Patent
Takayama et al.

(10) Patent No.: US 7,381,257 B2
(45) Date of Patent: Jun. 3, 2008

(54) AQUEOUS INK, INK-JET RECORDING METHOD, INK CARTRIDGE, RECORDING UNIT AND INK JET RECORDING APPARATUS

(75) Inventors: Hideki Takayama, Fujisawa (JP); Shinichi Hakamada, Kawasaki (JP); Masako Udagawa, Kawasaki (JP); Kouhei Nakagawa, Yokohama (JP); Hirofumi Ichinose, Tokyo (JP); Nobuyuki Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/674,344

(22) Filed: Feb. 13, 2007

(65) Prior Publication Data

US 2007/0188572 A1    Aug. 16, 2007

(30) Foreign Application Priority Data

Feb. 15, 2006  (JP)  .............................. 2006-038270
Feb. 15, 2006  (JP)  .............................. 2006-038271

(51) Int. Cl.
  C09D 11/00   (2006.01)
  C09D 11/02   (2006.01)
  B41J 2/01    (2006.01)

(52) U.S. Cl. .............................. 106/31.78; 106/31.86; 347/100

(58) Field of Classification Search ............. 106/31.78, 106/31.86; 347/100
See application file for complete search history.

(56) References Cited

U.S. PATENT DOCUMENTS

| | | | |
|---|---|---|---|
| 4,289,698 A * | 9/1981 | Stepp | 540/138 |
| 4,723,129 A | 2/1988 | Endo et al. | 346/1.1 |
| 4,740,796 A | 4/1988 | Endo et al. | 346/1.1 |
| 5,782,967 A | 7/1998 | Shirota et al. | 106/31.58 |
| 6,036,307 A | 3/2000 | Hakamada et al. | 347/106 |
| 6,152,999 A * | 11/2000 | Erdtmann et al. | 106/31.6 |
| 6,214,963 B1 | 4/2001 | Noguchi et al. | 528/71 |
| 6,398,355 B1 | 6/2002 | Shirota et al. | 347/100 |
| 6,398,858 B1 | 6/2002 | Yu et al. | 106/31.64 |
| 6,402,316 B1 | 6/2002 | Ichinose | 347/101 |
| 6,435,658 B1 | 8/2002 | Kato et al. | 347/43 |
| 6,474,803 B1 | 11/2002 | Shirota et al. | 347/100 |
| 6,514,330 B1 | 2/2003 | Kanaya et al. | 106/31.49 |
| 6,540,329 B1 | 4/2003 | Kaneko et al. | 347/43 |
| 6,552,156 B2 | 4/2003 | Noguchi et al. | 528/71 |
| 6,582,070 B2 | 6/2003 | Takada et al. | 347/100 |
| 6,605,336 B2 | 8/2003 | Ichinose et al. | 428/195 |
| 6,676,254 B2 | 1/2004 | Nagashima et al. | 347/100 |
| 6,685,999 B2 | 2/2004 | Ichinose et al. | 428/32.25 |
| 6,686,000 B2 | 2/2004 | Ichinose | 428/32.32 |
| 6,698,876 B2 | 3/2004 | Sato et al. | 347/100 |

(Continued)

FOREIGN PATENT DOCUMENTS

| | | |
|---|---|---|
| EP | 1 146 090 A2 | 10/2001 |
| JP | 2000-355665 | 12/2000 |
| JP | 2001-354886 | 12/2001 |
| JP | 2002-332440 | 11/2002 |
| JP | 2003-012982 | 1/2003 |

(Continued)

Primary Examiner—Helene Klemanski
(74) Attorney, Agent, or Firm—Fitzpatrick, Cella, Harper & Scinto

(57) ABSTRACT

An aqueous ink to be used in an ink jet recording containing a green pigment having a copper phthalocyanine skeleton, wherein a proportion of the Kα-line intensity of a chlorine atom to the Kα-line intensity of a bromine atom obtained by subjecting the green pigment to X-ray fluorescence analysis is 3.3 or more to 10.0 or less.

8 Claims, 6 Drawing Sheets

U.S. PATENT DOCUMENTS

| | | | |
|---|---|---|---|
| 6,723,137 B1 | 4/2004 | Hakamada et al. | 8/549 |
| 6,843,840 B2 | 1/2005 | Kataoka et al. | 106/31.6 |
| 6,848,781 B2 | 2/2005 | Ogino et al. | 347/105 |
| 6,874,881 B2 | 4/2005 | Suzuki et al. | 347/100 |
| 6,929,362 B2 | 8/2005 | Takada et al. | 347/100 |
| 6,932,465 B2 | 8/2005 | Nito et al. | 347/96 |
| 6,935,732 B2 | 8/2005 | Takada et al. | 347/96 |
| 6,966,944 B2 | 11/2005 | Shimomura et al. | 106/31.43 |
| 7,015,259 B2* | 3/2006 | Kataoka et al. | 523/160 |
| 7,029,109 B2 | 4/2006 | Shirota et al. | 347/100 |
| 7,055,943 B2 | 6/2006 | Suzuki et al. | 347/100 |
| 7,060,335 B2 | 6/2006 | Ichinose | 428/32.32 |
| 7,125,111 B2 | 10/2006 | Udagawa et al. | 347/100 |
| 7,135,208 B2* | 11/2006 | Kubota | 427/256 |
| 7,141,105 B2 | 11/2006 | Udagawa et al. | 106/31.49 |
| 7,144,449 B2 | 12/2006 | Udagawa et al. | 106/31.15 |
| 7,144,452 B2 | 12/2006 | Takayama et al. | 106/31.52 |
| 7,185,978 B2 | 3/2007 | Nagashima et al. | 347/100 |
| 7,195,340 B2 | 3/2007 | Nagashima et al. | 347/56 |
| 7,198,664 B2 | 4/2007 | Mafune et al. | 106/31.28 |
| 7,198,665 B2 | 4/2007 | Nakamura et al. | 106/31.52 |
| 7,208,032 B2 | 4/2007 | Hakamada et al. | 106/31.27 |
| 7,247,196 B2 | 7/2007 | Sato et al. | 106/31.52 |
| 7,267,716 B2 | 9/2007 | Nagashima et al. | 106/31.6 |
| 7,276,112 B2 | 10/2007 | Tokuda et al. | 106/31.6 |
| 2002/0077383 A1 | 6/2002 | Takao et al. | 523/160 |
| 2003/0144377 A1 | 7/2003 | Sano et al. | 523/160 |
| 2005/0007436 A1 | 1/2005 | Ogino et al | 347/105 |
| 2005/0041082 A1 | 2/2005 | Kataoka | 347/100 |
| 2005/0075449 A1* | 4/2005 | Kubota | 524/588 |
| 2005/0088501 A1 | 4/2005 | Nagashima et al. | 347/100 |
| 2005/0203210 A1* | 9/2005 | Kataoka et al. | 523/160 |
| 2005/0204955 A1 | 9/2005 | Nagashima et al. | 106/31.59 |
| 2005/0219341 A1 | 10/2005 | Nito et al. | 347/100 |
| 2006/0007288 A1 | 1/2006 | Takada et al. | 347/100 |
| 2006/0007289 A1 | 1/2006 | Nito et al. | 347/100 |
| 2006/0012657 A1 | 1/2006 | Nagashima et al. | 347/100 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0124032 A1 | 6/2006 | Ichinose et al. | 106/400 |
| 2006/0125895 A1 | 6/2006 | Nito et al. | 347/100 |
| 2006/0135647 A1 | 6/2006 | Ichinose et al. | 523/160 |
| 2006/0192827 A1 | 8/2006 | Takada et al. | 347/100 |
| 2006/0196389 A1 | 9/2006 | Tsuji et al. | 106/31.43 |
| 2006/0234018 A1 | 10/2006 | Nagashima et al. | 428/195.1 |
| 2006/0284929 A1 | 12/2006 | Matsuzawa et al. | 347/43 |
| 2007/0029522 A1 | 2/2007 | Udagawa et al. | 252/301.16 |
| 2007/0034114 A1 | 2/2007 | Udagawa et al. | 106/31.15 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0134451 A1 | 6/2007 | Hakamada et al. | 428/32.38 |
| 2007/0148376 A1 | 6/2007 | Tomioka et al. | 428/32.1 |
| 2007/0191508 A1 | 8/2007 | Nakagawa et al. | 523/160 |
| 2007/0252868 A1 | 11/2007 | Sanada et al. | 347/33 |

FOREIGN PATENT DOCUMENTS

| | | |
|---|---|---|
| JP | 2004-155826 | 6/2004 |
| JP | 2004-339355 | 12/2004 |
| WO | WO 00/52102 A1 | 9/2000 |
| WO | WO 02/100959 A1 | 12/2002 |
| WO | WO 2004/069543 A1 | 8/2004 |
| WO | WO 2004/094541 A1 | 11/2004 |

* cited by examiner

AQUEOUS INK, INK-JET RECORDING METHOD, INK CARTRIDGE, RECORDING UNIT AND INK JET RECORDING APPARATUS

BACKGROUND OF THE INVENTION

1. Field of the Invention

The present invention relates to a method to fully use a green pigment having a copper phthalocyanine skeleton as a coloring material of an aqueous ink, and also relates an aqueous ink (hereinafter referred to as "ink"), an ink set, and an ink jet recording method, an ink cartridge, a recording unit and an ink jet recording apparatus using the ink.

2. Description of the Related Art

It has been well known to use an ink (pigment ink) containing a pigment as a coloring material in order to improve the light fastness, gas fastness and water fastness of an image obtained by an ink jet recording method. However, pigments are generally poor in color developability compared with dyes. In color images formed with inks of three primary colors of cyan, magenta and yellow, an image formed with pigment inks has a clearly narrow color reproduction range when dye inks and pigment inks are compared. In view of the above-mentioned circumstances, there is a demand to develop a method to form a color image which has a excellent in color balance and to be able to achieve a broad color reproduction range.

It is thus conducted to form an image with inks of red, green and blue in addition to the inks of three primary colors of cyan, magenta and yellow (see Japanese Patent Application Laid-Open Nos. 2001-354886 and 2004-155826 and International Publication No. 2002/100959 Pamphlet). At this time, C.I. Pigment Green 7 and C.I. Pigment Green 36 that are halogenated phthalocyanine pigments are often used as coloring materials for ink jet green inks (see Japanese Patent Application Laid-Open Nos. 2000-355665, 2004-339355, 2002-332440 and 2003-012982).

SUMMARY OF THE INVENTION

The present inventors have mainly investigated green inks containing a green pigment having a copper phthalocyanine skeleton (hereinafter may be referred to as "green pigment" merely) in order to widen the color reproduction range of images formed with pigment inks. In the course of the investigation, it has been found that when the green ink is ejected by means of an ink jet recording apparatus, ejection stability such as frequency responsiveness, stable ejection volume and stable ejection velocity may not be achieved in some cases. This phenomenon has been particularly marked in an ink jet recording apparatus that an ink is ejected from a recording head by the action of thermal energy. In addition, when the above-described ink has been stored for a long period of time, in some cases, the average particle size of pigment particles in the ink may have been increased, or aggregates may be precipitated.

In view of the above-mentioned circumstances, firstly, the present invention provides an ink excellent in ejection stability and storage stability though a green pigment is used as a coloring material for an ink-jet ink. Secondly, the present invention provides an ink set constituting an ink containing a green pigment having a copper phthalocyanine skeleton, that is excellent in color balance and can achieve a broad color reproduction range. Furthermore, the present invention provides an ink jet recording method, an ink cartridge, a recording unit and an ink jet recording apparatus using the above-described ink or ink set.

The above-described present invention can be achieved as follows. More specifically, an ink according to the present invention is an aqueous ink to be used in an ink jet recording including at least a green pigment having a copper phthalocyanine skeleton, wherein the proportion of the $K\alpha$-line intensity of a chlorine atom to the $K\alpha$-line intensity of a bromine atom obtained by subjecting the green pigment to X-ray fluorescence analysis is 3.3 or more to 10.0 or less.

An ink set according to another embodiment of the present invention is an ink set obtained by combining a plurality of aqueous inks, wherein the plurality of aqueous inks include a green ink, a red ink and a blue ink, the coloring material of the green ink is C.I. Pigment Green 7 as a halogenated copper phthalocyanine pigment, the coloring material of the red ink is C.I. Pigment Red 149, and the coloring material of the blue ink is C.I. Pigment Violet 23.

An ink set according to a further embodiment of the present invention is an ink set to be used in an ink jet recording obtained by combining a plurality of aqueous inks, wherein the plurality of aqueous inks include a green ink, a red ink and a blue ink, the green ink is the above-described aqueous ink, the coloring material of the red ink is C.I. Pigment Red 149, and the coloring material of the blue ink is C.I. Pigment Violet 23.

An ink-jet recording method according to a still further embodiment of the present invention is an ink jet recording method including ejecting an ink by an ink jet recording method to conduct recording on a recording medium, wherein the above-described aqueous ink or the ink constituting the above-described ink set is used.

An ink cartridge according to a yet still further embodiment of the present invention is an ink cartridge including an ink storage portion storing an ink, wherein the ink stored is the above-described aqueous ink or the ink constituting the above-described ink set.

A recording unit according to a yet still further embodiment of the present invention is a recording unit including an ink storage portion storing an ink and a recording head for ejecting the ink, wherein the ink stored is the above-described aqueous ink or the ink constituting the above-described ink set.

An ink jet recording apparatus according to a yet still further embodiment of the present invention is an ink jet recording apparatus including an ink storage portion storing an ink and a recording head for ejecting the ink, wherein the ink stored is the above-described aqueous ink or the ink constituting the above-described ink set.

According to the present invention, there can be provided an ink capable of achieving good ejection stability in particular even when the ink is used in an ink jet recording method that an ink is continuously ejected from a recording head by the action of thermal energy and achieving excellent storage stability when the ink is stored in a long period of time. According to another embodiment of the present invention, there can be provided an ink set excellent in color balance and capable of achieving a broad color reproduction range. According to a further embodiment of the present invention, there can be provided an ink jet recording method, an ink cartridge, a recording unit and an ink jet recording apparatus using the above-described ink or ink set.

Further features of the present invention will become apparent from the following description of exemplary embodiments with reference to the attached drawings.

DESCRIPTION OF THE EMBODIMENTS

Figure 1:
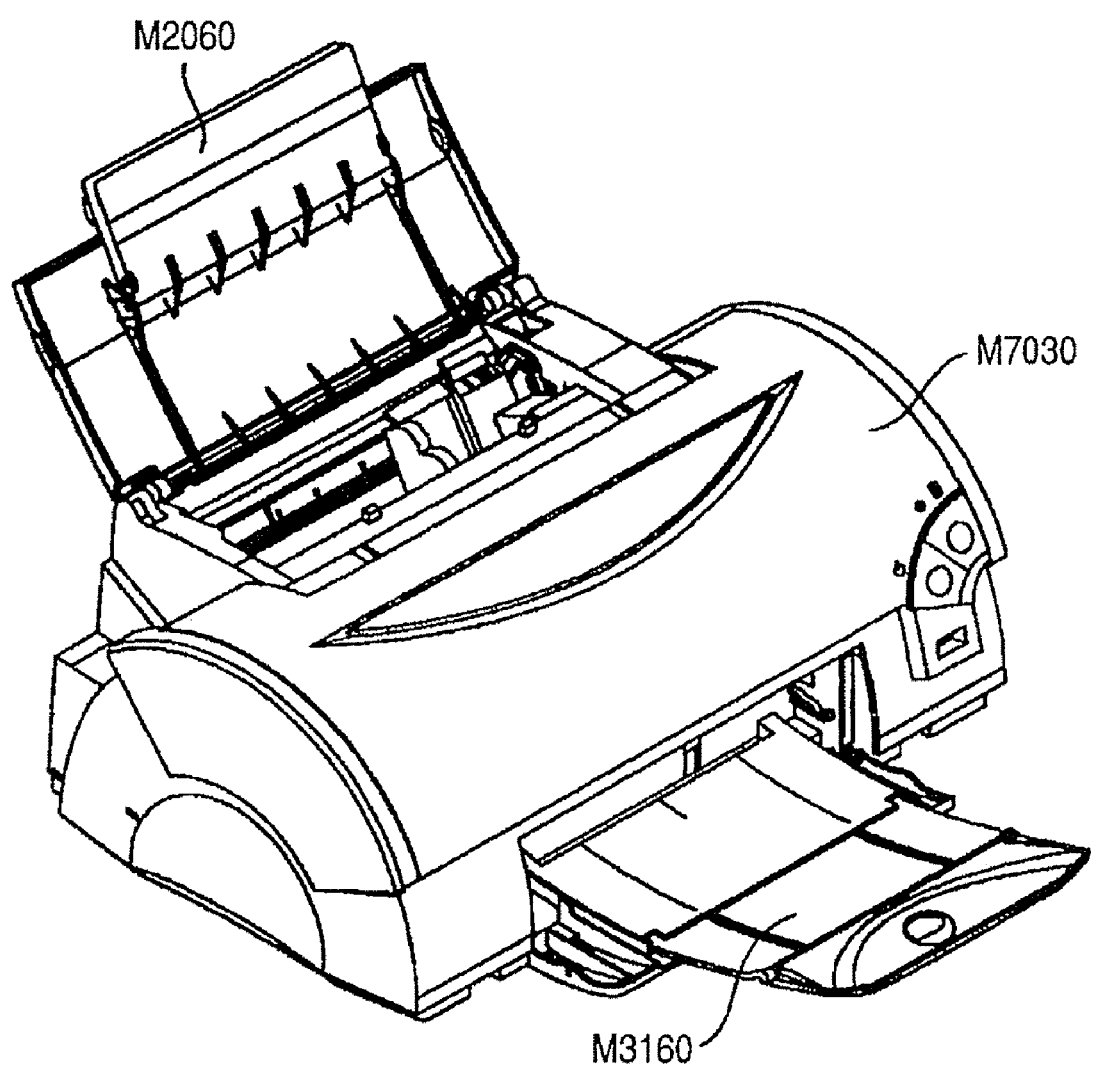
FIG. 1 is a perspective view of an ink jet recording apparatus.

The present invention will hereinafter be described in detail by exemplary embodiments. Firstly, how the invention has been completed will be described. The present inventors have found that in the course of the investigation as to green inks containing, as a coloring material, a green pigment having a copper phthalocyanine skeleton, the ejection stability and storage stability of the inks are affected by a difference in the substituent of the pigment.

In view of the above-mentioned circumstances, the present inventors made a more detailed investigation as to make full use of the green pigment having the copper phthalocyanine pigment as a coloring material of the aqueous ink. The pigments used in the present invention are green pigments having a copper phthalocyanine skeleton. The green pigments having the copper phthalocyanine skeleton include C.I. Pigment Green 7 and C.I. Pigment Green 36. C.I. Pigment green 7 is a halogenated copper phthalocyanine pigment having a chlorine atom and a bromine atom as substituents. C.I. Pigment Green 36 is also a halogenated copper phthalocyanine pigment having a chlorine atom and a bromine atom as substituents and is high in bromine atom content compared with C.I. Pigment Green 7. In the present invention, a copper phthalocyanine pigment having each of a chlorine atom and a bromine atom as substituents, especially a pigment obtained by substituting a bromine atom for a part of the chlorine atom in the phthalocyanine skeleton of green pigment and containing the chlorine atom and bromine atom in specific proportions in particular is used.

As a result of the investigation by the present inventors, it has been found that the proportions of the chlorine atom and bromine atom, which are substituents substituting on the copper phthalocyanine skeleton, exert a great influence on the ejection stability and storage stability of the resulting ink. In particular, the influence exerted on the ejection stability markedly appears when the ink is ejected by means of the so-called thermal type ink jet recording apparatus that an ink is ejected from a recording head by the action of thermal energy.

The present inventors have thus carried out an investigation for finding the constitution of a green pigment capable of providing an ink excellent in ejection stability and storage stability though the ink is an ink containing the green pigment. Specifically, various green pigments, in which the proportions of the chlorine atom and bromine atom substituting on the copper phthalocyanine skeleton were varied, were synthesized in the following manner, and an investigation was made on the correlation between the inks respectively containing these pigments and the properties thereof.

The contents of the chlorine atom and bromine atom substituting on the copper phthalocyanine skeleton were first changed by a method in which copper phthalocyanine is dissolved in an eutectic salt of aluminum chloride and sodium chloride, and chlorine gas and bromine gas are introduced into the solution to conduct halogenation. The proportions of the chlorine atom and bromine atom bonded as substituents to the copper phthalocyanine skeleton of each of the pigments prepared in such a manner were then determined by measuring the $K\alpha$-line intensity of the chlorine atom and the $K\alpha$-line intensity of the bromine atom using an X-ray fluorescence analyzer. Thereafter, a pigment dispersion was prepared with each of the pigments obtained above, and materials for an ink, such as the pigment dispersion and an aqueous medium, were mixed to prepare inks. The resultant inks were used to evaluate the inks as to ejection stability and storage stability, thereby investigating the correlation between these properties and the proportions of the chlorine atom and bromine atom contained in the substituents substituting on the copper phthalocyanine skeleton of the green pigment.

In the present invention, the proportion of the $K\alpha$-line intensity of a chlorine atom to the $K\alpha$-line intensity of a bromine atom (($K\alpha$-line intensity of chlorine atom)/($K\alpha$-line intensity of bromine atom)) in a green pigment was measured according to the following method. The proportion can be calculated out from the peak intensity ratio of the chlorine atom to the bromine atom obtained by measurement using an X-ray fluorescence analyzer ZSXmin (manufactured by Rigaku Industrial Corp.) under conditions of an acceleration voltage of 40 kV and 1.20 mA. Quite naturally, the present invention is not limited thereto.

Inspection as to whether an unknown ink contains the green pigment having the above-described properties or not can be conducted by the following method. The ink is first centrifuged to separate the ink into a solid component and a liquid component. Thereafter, only the solid component precipitated is taken out and washed with ion-exchanged water. After the solid component washed is dried, the $K\alpha$-line intensity of the chlorine atom and the $K\alpha$-line intensity of the bromine atom are measured, whereby the inspection can be made.

As a result of the investigation, it has been found that the ejection stability is lowered when the proportion of the $K\alpha$-line intensity of the chlorine atom to the $K\alpha$-line intensity of the bromine atom is made less than 3.3, while the storage stability is lowered when the proportion is made more than 10.0. In the present invention, as the green pigment having the copper phthalocyanine skeleton, a pigment, in which the proportion of the $K\alpha$-line intensity of the chlorine atom to the $K\alpha$-line intensity of the bromine atom has been controlled within a specific range, is used. In the present invention, the green pigment capable of achieving the above-described effect is defined by the proportion of the $K\alpha$-line intensity of the chlorine atom to the $K\alpha$-line intensity of the bromine atom, which is obtained by counting the number of the chlorine atoms and bromine atoms substituting on the copper phthalocyanine skeleton by the X-ray fluorescence analysis.

The reason why the ejection stability and storage stability of the resulting ink are greatly varied by changing the proportions of the chlorine atom and bromine atom contained in the green pigment is unknown. However, the present inventors infer the following.

(Case where the proportion of the $K\alpha$-line intensity of the chlorine atom to the $K\alpha$-line intensity of the bromine atom ((Kα-line intensity of chlorine atom)/(Kα-line intensity of bromine atom)) is less than 3.3)

The green pigment used in the present invention is an aggregate of molecules, in which a part of hydrogen atoms of the phthalocyanine skeleton are replaced by chlorine atom(s) and bromine atom(s). The atomic radius of the bromine atom is larger than the atomic radius of the chlorine atom. Therefore, it is considered that a green pigment becomes an aggregate of bulkier molecules as the proportion of the bromine atom in the green pigment increases. Since an ink-jet ink is an aqueous ink containing an aqueous medium, and a pigment is water-insoluble, the pigment used as a coloring material is present in the ink in a state that a polymer (polymer dispersant), a surfactant and moreover a hydrophilic group have been adsorbed on or bonded to the surfaces of pigment particles. As the result of the investigation by the present inventors, it has been found that the polymer, the surfactant and moreover the hydrophilic group are hard to be adsorbed on or bonded to the surfaces of the pigment particles as the molecules making up the pigment are bulkier. The present inventors have carried out a further detailed investigation. As a result, it has been found that in the case of the green pigment, a range in which the polymer and surfactant are hard to be adsorbed on or bonded to the surface of the pigment can be determined by the proportion between the respective Kα-line intensities of the chlorine atom and bromine atom as measured by the X-ray fluorescence analysis. More specifically, it has been found that when a green pigment of which the proportion of the Kα-line intensity of the chlorine atom to the Kα-line intensity of the bromine atom is less than 3.3 is used, the amount of substances enhancing hydrophilicity, such as polymers, adsorbed on or bonded to the surface of the pigment lessens. It has also been found that when in particular, a polymer is used as the substance enhancing hydrophilicity, an influence of steric hindrance is easier to be exerted, and the polymer is harder to be adsorbed on or bonded to the surface of the pigment as the molecular weight or hydrophilicity of the polymer is higher.

It is considered that when an ink containing a pigment dispersion, on which such a substance enhancing hydrophilicity as described above is not sufficiently adsorbed, is ejected by means of a thermal type ink jet recording apparatus, the frequency of occurrence of dispersion breakdown by heat applied to the ink upon ejection is high. The present inventors infer that the reason why ejection failure occurs in the ink containing the green pigment of which the proportion of the Kα-line intensity of the chlorine atom to the Kα-line intensity of the bromine atom is less than 3.3 is as follows. More specifically, it is considered that when such an ink is used in ink jet recording, a great amount of dispersion breakdown products is produced in the process of the continuous ejection of the ink because the substance enhancing hydrophilicity on the surface of the pigment is insufficient. As a result, it is inferred that frequency responsiveness, ejection volume and ejection velocity are lowered in the ink containing the green pigment having the above-described properties.

(Case where the proportion of the Kα-line intensity of the chlorine atom to the Kα-line intensity of the bromine atom ((Kα-line intensity of chlorine atom)/(Kα-line intensity of bromine atom)) is more than 10.0)

On the other hand, since the atomic radius of the chlorine atom is smaller than the atomic radius of the bromine atom, it is considered that steric hindrance is less as the proportion of the bromine atom is lower. As a result, substances enhancing the hydrophilicity of the surface of a pigment, such as polymers, surfactants and moreover hydrophilic groups are easy to be adsorbed on or bonded to the surface of the pigment. Thus, the pigment is expected to have good dispersion stability. However, according to the investigation by the present inventors, it has been found that if the proportion of the bromine atom is too low, more specifically, the proportion of the Kα-line intensity of the chlorine atom to the Kα-line intensity of the bromine atom is more than 10.0, such a pigment tends to lower the dispersion stability to the contrary. The present inventors infer the reason for this in the following manner. The pigment forms one particle from repeatedly piled-up molecules thereof. If the proportion of the bromine atom great in atomic radius is too low at this time, the symmetry of the molecule is improved, and so the crystallization of the molecules making up the pigment particles is easy to progress. In other words, the present inventors infer that crystals overgrow, and so the pigment is hard to be dispersed, and consequently the dispersion stability is lowered.

Figure 7:
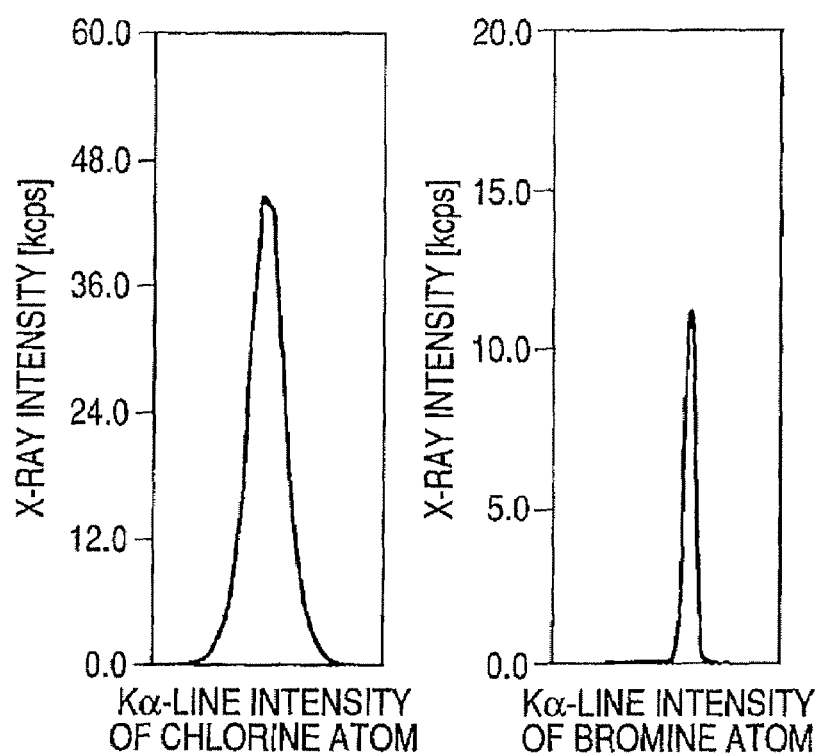
FIG. 7 diagrammatically illustrates an example of the result of the X-ray fluorescence analysis of green pigment.

The present inventors have obtained the following finding based on the above-described findings. More specifically, it has been found that when a green pigment of which the proportion of the Kα-line intensity of a chlorine atom to the Kα-line intensity of a bromine atom obtained by X-ray fluorescence analysis is 3.3 or more to 10.0 or less is used as a coloring material both the ejection stability of the resulting ink and the storage stability thereof can be obtained. FIG. 7 diagrammatically illustrates an example of the result of the X-ray fluorescence analysis of a green pigment usable in the present invention. In FIG. 7, the Kα-line intensity of the chlorine atom is 43.5 kcps, and the Kα-line intensity of the bromine atom is 11.2 kcps. Accordingly, the proportion of the Kα-line intensity of the chlorine atom to the Kα-line intensity of the bromine atom ((Kα-line intensity of chlorine atom)/(Kα-line intensity of bromine atom)) is 3.9. In the ink according to the present invention, the upper limit of the proportion of the Kα-line intensity of the chlorine atom to the Kα-line intensity of the bromine atom is more preferably 5.0 or less. The lower limit of the proportion of the Kα-line intensity of the chlorine atom to the Kα-line intensity of the bromine atom is more preferably 4.0 or less.

It is well known to use C.I. Pigment Green 7 or C.I. Pigment Green 36 as a coloring material for an ink jet ink. However, the present inventors have investigated the proportion of the Kα-line intensity of the chlorine atom to the Kα-line intensity of the bromine atom as to commercially available C.I. Pigment Green 7 and C.I. Pigment Green 36 according to the above-describe method. As a result, the following fact has been obtained. More specifically, the proportion of the Kα-line intensity of the chlorine atom to the Kα-line intensity of the bromine atom in all the C.I. Pigment Green 7 investigated was a value more than 10.0. The proportion of the Kα-line intensity of the chlorine atom to the Kα-line intensity of the bromine atom in all the C.I. Pigment Green 36 investigated was a value less than 3.0. The reason for this is unknown. However, the present inventors infer the following.

First of all, since the third substance, i.e., a crystallization inhibitor, is contained in the commercially available C.I. Pigment Green 7, the crystallization (aggregation of pigment) owing to such improvement in the symmetry of the molecule as described above is hard to occur. According to the investigation by the present inventors, the influence of steric hindrance is harder to be exerted as the proportion of the chlorine atom is increased, and so there has been a tendency for the substances enhancing the hydrophilicity of the surface of a pigment, such as polymers, surfactants and moreover hydrophilic groups to be easily adsorbed on the surface of the pigment. From this fact, it is considered that the commercially available C.I. Pigment Green 7 contains the crystallization inhibitor, and the proportion of the Kα-line intensity of the chlorine atom to the Kα-line intensity of the bromine atom is more than 10.0 for obtaining a stable pigment dispersion.

On the other hand, since the commercially available C.I. Pigment Green 36 contains a large amount of the bromine atom substituting on the copper phthalocyanine skeleton, the molecular skeleton of the coloring material is large, and so the storage stability of the resulting ink may not be sufficiently achieved in some cases. When an ink containing the commercially available C.I. Pigment Green 36 is applied to the thermal type ink jet recording apparatus, the ejection stability of the ink may not be sufficiently achieved in some cases because of its molecular structure.

However, according to the investigation by the present inventors, it has been found that when the conventional C.I. Pigment Green 7 or C.I. Pigment Green 36 is used as an ink to be applied to the thermal type ink jet recording apparatus in particular, the following problem is caused. More specifically, it has been found that such a crystallization inhibitor is not preferred because the inhibitor forms the main cause of kogation, and is also not preferred from the viewpoint of ejection stability.

The present inventors have thus concluded to use the green pigment of which the proportion of the Kα-line intensity of the chlorine atom to the Kα-line intensity of the bromine atom is 3.3 or more to 10.0 or less unlike the conventional C.I. Pigment Green 7 and C.I. Pigment Green 36.

<Aqueous Ink>

The ink according to the present invention includes a green pigment having a copper phthalocyanine skeleton of which the proportion of the Kα-line intensity of the chlorine atom to the Kα-line intensity of the bromine atom obtained by X-ray fluorescence analysis is 3.3 or more to 10.0 or less. However, other constitution may be the same as in a conventional pigment ink. The respective components making up the ink according to the present invention will hereinafter be described.

(Green Pigment)

The content of the green pigment, which is a coloring material, in the ink according to the present invention is preferably 1.0 mass % or more to 10.0 mass % or less, more preferably 2.0 mass % or more to 6.0 mass % or less with respect to the whole mass of the ink. If the content of the green pigment is less than 1.0 mass %, a sufficient optical density may not be achieved in some cases. If the content is more than 10.0 mass %, the sticking resistance of the resulting ink may not be deteriorated in some cases.

(Dispersing System of Pigment)

As a dispersing system of the green pigment making up the ink according to the present invention, may be used any system. Specifically, a polymer dispersion pigment, which is dispersed with a dispersant, may be used. A microcapsule pigment microencapsulated by covering the surface of a pigment with an organic polymer, and a self dispersion pigment, into the surfaces of particles of which a hydrophilic group is introduced, may also be used. In addition, a pigment, to the surfaces of particles of which a polymer-containing an organic group is chemically bonded (polymer-bonded type self dispersion pigment) may also be used. It goes without saying that these pigments different from one another in dispersing method may also be used in combination. The pigments of these types will hereinafter be described.

(Polymer Dispersion Pigment)

A dispersant used for the polymer dispersion pigment can be a dispersant capable of stably dispersing the pigment in an aqueous medium by an action of a hydrophilic group, particularly, an anionic group. For example, the following dispersants may be used. Examples thereof include styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic acid half ester copolymers, vinylnaphthalene-acrylic acid copolymers, vinylnaphthalene-maleic acid copolymers, styrene-maleic anhydride-maleic acid half ester copolymers, benzyl methacrylate-methacrylic acid copolymers, and salts of these copolymers.

The polymer used as the dispersant is preferably a block polymer. The reason for this is as follows. In the block polymer, a hydrophilic unit and a hydrophobic unit are regularly arranged in its molecular structure. On the other hand, in a random polymer, a hydrophilic unit and a hydrophobic unit are irregularly arranged in its molecular structure. In the block polymer, therefore, the hydrophobic unit which is easily adsorbed on a pigment is somewhat locally present in the structure of the polymer compared with the random polymer. From such a difference in form between the polymers, the block polymer is hard to be separated from a pigment compared with the random polymer, and so high ejection stability is more easily retained. Incidentally, block polymers usable in the present invention include the following polymers: AB block type in which a hydrophobic monomer unit (referred to as block A) and an ionic hydrophilic monomer unit (referred to as block B) are respectively localized, and ABC block type in which a nonionic hydrophilic monomer unit (referred to as block C) is further added. The present invention is not limited thereto.

The weight average molecular weight of the dispersant is preferably from 1,000 or more to 30,000 or less. In the present invention, the weight average molecular weight of the dispersant is particularly favorably from 1,500 or more to 6,000 or less, further from 2,000 or more to 5,000 or less. It is very rare in an ordinary ink jet pigment ink to use a polymer having a weight average molecular weight of 1,500 or more to 6,000 or less as a dispersant. In the present invention, however, such a polymer having a low weight average molecular weight is particularly preferably used from the following reason. Since a bulky atom such as a bromine atom is added to the green pigment used in the present invention, it is considered that a substance enhancing the hydrophilicity, such as a polymer, is hard to be adsorbed on the surface of the pigment. In the present invention, it is thus considered that the use of the polymer having a weight average molecular weight of from 1,500 or more to 6,000 or less, further from 2,000 or more to 5,000 or less is preferred from the viewpoint of improving the ejection stability and long-term storage stability. The reason for it is unknown. However, the present inventors infer the following.

In the case of a polymer having a weight average molecular weight 6,000 or less, further 5,000 or less, an influence of reduced amount of adsorption of the polymer due to the steric hindrance characteristic of the green pigment used in the present invention is hard to be exerted because of its low weight average molecular weight. As a result, the polymer can be adsorbed on the surface of the pigment in an amount sufficient to stably disperse the green pigment even when the content of the polymer in the ink is low. The polymer having a weight average molecular weight of 1,500 or more, further of 2,000 or more can disperse the pigment in a sufficiently stable state. Incidentally, the present inventors confirmed the fact that the use of the polymer having a weight average molecular weight of 6,000 or less, further of 5,000 or less permits increasing the adsorption of the polymer on the surface of the green pigment compared with the polymer having a weight average molecular weight more than 6,000, further more than 5,000 by the following method. Namely, aqueous dispersions of pigment dispersions with the green pigment respectively dispersed with polymers different from each other in weight average molecular weight were centrifuged, the resultant supernatants were dipped in an acid, and the masses of the resultant compounds were compared with each other to confirm the fact.

The content of the polymer having a weight average molecular weight ranging from 1,500 or more to 6,000 or less when the green pigment of which the proportion of the chlorine atom to the bromine atom falls within a specific range as used in the present invention is dispersed with such a polymer is as follows. More specifically, the content (mass %) of the polymer in the ink is 0.5 time or more to 1.0 time or less in terms of based on the content (mass %) of the green pigment (content of the polymer/content of the green pigment).

When the content of the polymer in the ink is controlled to 0.5 times or more based on the content of the pigment as described above, the polymer is adsorbed again on a surface site of the pigment, from which the polymer is desorbed, even if the polymer is desorbed from the surface of the pigment, so that the polymer is present in a sufficient amount in the ink. As a result, it is inferred that even the green polymer, on the surface of which the polymer is hard to be adsorbed due to the influence of the steric hindrance, can adsorb the polymer in an amount sufficient to stably disperse the pigment so far as such constitution as described above is adopted. On the other hand, when the content of the polymer in the ink is increased to more than 1.0 time based on the content of the pigment, in the case of the green pigment used in the present invention, the amount of the polymer not adsorbed on the pigment increases. Therefore, ejection stability may not be deteriorated in some cases due to viscosity increase of the ink attending on evaporation of water in the ink and adhesion of the polymer to ejection orifices.

The content (mass %) of the polymer in the ink is preferably 0.5 mass % or more to 10.0 mass % or less, further 0.5 mass % or more to 3.0 mass % or less with respect to the whole mass of the ink. In the present invention, the content (mass %) of the polymer in the ink is particularly preferably 0.9 mass % or more to 1.8 mass % or less with respect to the whole mass of the ink. When the content of the polymer in the ink falls within the range of from 0.9 mass % or more to 1.8 mass % or less as described above, the lowering of the ejection stability is prevented, and the excellent dispersion stability can be retained over a long period of time.

(Self Dispersion Pigment)

In the present invention, a self dispersion pigment, which is obtained by bonding an ionic group (for example, an anionic group) to the surface of the pigment and can be dispersed in an aqueous medium without using a dispersant, may also be used.

Examples of the anionic self dispersion pigment include pigments, to the surfaces of which at least one anionic group of —COOM, —SO$_3$M, —PO$_3$HM and —PO$_3$M$_2$ is bonded. In these formulae, M is hydrogen, alkali metal, ammonium or organic ammonium.

(Microcapsule Pigment)

In the present invention, a microcapsule pigment microencapsulated by covering the surface of a pigment with an organic polymer may also be used. Processes for microencapsulating the pigment include a chemical preparation process, physical preparation process, physicochemical preparation process and mechanical preparation process. Specific processes include an interfacial polymerization process, in-situ polymerization process, in-liquid curing and coating process, coacervation (phase separation) process, in-liquid drying process, melt dispersion and cooling process, in-air suspension coating process, spray drying process, acid dipping process and phase inversion emulsification process.

(Polymer-Bonded Type Self Dispersion Pigment)

In the present invention, a polymer-bonded type self dispersion pigment, to the surfaces of particles of which a polymer-containing organic group is chemically bonded, may also be used. The polymer-bonded type self dispersion pigment preferably contains a reaction product of a functional group, which is chemically bonded to the surface of a green pigment directly or through another atomic group, with a copolymer of an ionic monomer and a hydrophobic monomer.

Other components than the green pigment, which makes up the ink according to the present invention, will now be described. As the other components than the green pigment used in the present invention, may be used any components making up conventional ink jet inks.

(Aqueous Medium)

In the ink, an aqueous medium, which contains water, or water and any of water-soluble organic solvents, is preferably used. The content (mass %) of the water-soluble organic solvent in the ink is preferably 3.0 mass % or more to 50.0 mass % or less with respect to the whole mass of the ink. The content (mass %) of water in the ink is preferably 50.0 mass % or more to 95.0 mass % or less with respect to the whole mass of the ink.

As the water, it is desirable to use deionized water. Examples of usable water-soluble organic solvents include alkanols having 1 to 4 carbon atoms, such as ethanol, isopropanol, n-butanol, isobutanol, sec-butanol and tert-butanol; carboxylic acid amides such as N,N-dimethylformamide and N,N-dimethylacetamide; ketones and ketone alcohols such as acetone, methyl ethyl ketone and 2-methyl-2-hydroxypentan-4-on; cyclic ethers such as tetrahydrofuran and dioxane; glycerol; glycols such as ethylene glycol, diethylene glycol, triethylene glycol, tetraethylene glycol, 1,2- or 1,3-propylene glycol, 1,2- or 1,4-butylene glycol, polyethylene glycol and thiodiglycol; polyhydric alcohols such as 1,3-butanediol, 1,5-pentanediol, 1,2-hexanediol, 1,6-hexanediol, 2-methyl-1,3-propanediol and 1,2,6-hexanetriol; alkyl ethers of polyhydric alcohols, such as ethylene glycol monomethyl (or monoethyl) ether, diethylene glycol monomethyl (or monoethyl) ether and triethylene glycol monomethyl (or monobutyl) ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide. These water-soluble organic solvents may be used either singly or in any combination thereof.

In the present invention, glycerol, ethylene glycol, diethylene glycol, polyethylene glycol and 2-pyrrolidone are particularly preferably used. When the polymer having a weight average molecular weight of from 1,500 or more to 6,000 or less, further from 2,000 or more to 5,000 or less is used as the dispersant for the green pigment, polyethylene glycol having an average molecular weight of 1,000 or more is particularly preferably used as the water-soluble organic solvent. An ink containing the polymer having the above-described weight average molecular weight and polyethylene glycol having an average molecular weight of 1,000 or more particularly shows improved ejection stability when ejection is continuously conducted for a long period of time. Incidentally, the upper limit of polyethylene glycol is 1,500 or less. When an ink contains polyethylene glycol, far excellent ejection stability can be achieved when the content of polyethylene glycol is equivalent to or more than the content of the green pigment in the ink.

(Other Additives)

The ink according to the present invention may further contain various kinds of additives in addition to the above-described components as needed. For example, solid humectants such as urea and urea derivatives, trimethylolpropane, and trimethylolpropane may be used. In addition, surfactants such as acetylene glycol derivatives, antifoaming agents, preservatives and mildewproofing agents may be used in order to provide an ink having desired physical properties.

<Ink Set>

An ink set excellent in color balance and capable of achieving a broad color reproduction range will hereinafter be described. The present inventors have carried out various investigations for improving the color reproduction range of images formed with a plurality of pigment inks including an ink containing a green pigment to the extent comparable to that of images formed with dye inks.

As a result, it has been found that the mere use of inks containing a coloring material simply high in saturation as inks used in addition to inks of three primary colors of cyan, magenta and yellow in order to widen a color reproduction range of an image formed with pigment inks fails to achieve a sufficient effect. It has also been found that in order to widen the color reproduction range of the image, it is particularly important to select coloring materials used in red, green and blue inks in view of the mutual influence of the light absorption characteristics of these coloring materials. The present inventors have thus found that red, green and blue inks respectively containing coloring materials selected in view of the above-described fact are used in combination, whereby an ink set excellent in color balance and capable of achieving a broader color reproduction range can be provided.

Thus the present inventors investigated fourth, fifth and sixth color inks other than the inks of three primary colors of cyan, magenta and yellow. More specifically, after several tens of pigment dispersions were prepared with the particle size distributions of pigments and dispersant made substantially uniform, materials for inks generally used in ink jet inks, such as an aqueous medium, were mixed to prepare several tens inks. Each of the inks obtained above was then applied to several recording media by an ink jet recording method to form images. With respect to the resultant images, a* and b* values in the L*a*b* color space prescribed by CIE (Commission Internationale de L'Eclairage) were measured to calculate out saturations from these values. Three inks, by which the highest saturation was obtained in blue, red and green regions, were selected based on the measured results of the saturations. An image including regions of higher-order colors (including secondary and tertiary colors) was formed with such three inks to evaluate color balance and color reproduction range. When the three inks selected in such a manner and giving the highest saturation were combined, the resultant ink set reached a comparable level of the color balance and color reproduction range obtained by a conventional pigment ink set. However, the set did not reach a comparable level of a dye ink set, to say nothing of a higher level.

Thus the present inventors arbitrarily combined the several tens of inks obtained above to form images including regions of higher-order colors (including secondary and tertiary colors) and evaluated color balance and color reproduction range about the resultant images in the same manner as described above. As a result, it was found that an image formed by using inks making up an ink set of the present invention, which will be described subsequently, in combination is best in color balance and color reproduction range in blue, red and green regions. This means that the best color balance and the broadest color reproduction range are not achieved even when a plurality of inks containing a coloring material giving the highest saturation in each hue is combined to form an image of higher-order colors.

Respective pigment inks making up an ink set of the present invention, which has been found by the present inventors in view of the result of such investigation as described above and is excellent in color balance and capable of achieving a broader color reproduction range, will be described.

A green ink and a blue ink used in formation of an image of a region of the third quadrant and the fourth quadrant represented by the a*b* coordinate in the L*a*b* color space prescribed by CIE are preferably inks respectively containing the following coloring materials. More specifically, the coloring material of the green ink is preferably C.I. Pigment Green 7, and the coloring material of the blue ink is preferably C.I. Pigment Violet 23. Such green ink and blue ink are used in combination, whereby the color reproduction range of the third quadrant and the fourth quadrant represented by the a*b* coordinate in the L*a*b* color space prescribed by CIE can be particularly widened.

The coloring material of a red ink used in formation of an image of a region of the first quadrant and the second quadrant represented by the a*b* coordinate in the L*a*b* color space prescribed by CIE is preferably C.I. Pigment Red 149. Such a red ink is used, whereby the color reproduction range of the first quadrant and the second quadrant represented by the a*b* coordinate in the L*a*b* color space prescribed by CIE can be particularly widened.

For a red ink and a blue ink used in formation of an image of a region of the first quadrant and the fourth quadrant represented by the a*b* coordinate in the L*a*b* color space prescribed by CIE are preferably inks respectively containing the following coloring materials. More specifically, as described above, the coloring material of the red ink is preferably C.I. Pigment Red 149, and the coloring material of the blue ink is preferably C.I. Pigment Violet 23. Such red ink and blue ink are used in combination, whereby the color reproduction range of the first quadrant and the fourth quadrant represented by the a*b* coordinate in the L*a*b* color space prescribed by CIE can be particularly widened.

In other words, green, blue and red inks constituting the ink set according to the present invention are preferably inks respectively containing the following coloring materials. More specifically, the coloring material of the green ink is preferably C.I. Pigment Green 7, the coloring material of the blue ink is preferably C.I. Pigment Violet 23, and the coloring material of the red ink is preferably C.I. Pigment red 149. Such green, blue and red inks are used in combination, whereby the color reproduction range of the first quadrant to the fourth quadrant represented by the a*b* coordinate in the L*a*b* color space prescribed by CIE can be particularly widened. Such an ink set is used, whereby an ink also excellent in color balance can be obtained.

The reason why the image formed with a plurality of the inks respectively containing the specific coloring materials is excellent in color balance and achieves a broader color reproduction range compared with the image formed with a plurality of the inks respectively containing the coloring materials giving the highest saturation in each hue as described above is not clearly known. However, the present inventors infer the reason for this in the following manner.

When an image including regions of higher-order colors (secondary color and tertiary color) is formed with the respective inks constituting the ink set according to the present invention, a plurality of coloring materials is present in a mixed state in the region of the image on a recording medium. At this time, the light absorption characteristics inherent in the coloring materials mutually exert some influence on the respective light absorption characteristics. What influence the respective coloring materials contained in the respective inks constituting the ink set according to the present invention specifically exert on one another on the recording medium is currently unknown. However, it is considered from the above-described fact that the combination of the respective inks constituting the ink set according to the present invention causes such a certain synergistic effect that the light absorption characteristics inherent in the respective coloring materials are mutually improved in particular. As a result, it is inferred that broader color reproduction range than that brought about by the performance inherent in the respective coloring materials can be achieved.

The ink set according to the present invention with the blue, red and green inks respectively containing the specific coloring materials combined with one another may include other inks. For example, inks of three primary colors of cyan, magenta and yellow, and further a black ink may be used in addition to the respective inks constituting the ink set according to the present invention. At this time also, the use of the ink set according to the present invention made up by the respective inks of blue, red and green more improves both color balance and color reproduction range compared with the combination of a plurality of inks containing a coloring material giving the highest saturation in each hue. The above-described effect can be particularly markedly achieved when the following inks are used as inks of three primary colors. More specifically, inks of three primary colors of a yellow ink containing C.I. Pigment Yellow 74, a magenta ink containing C.I. Pigment Red 122 and a cyan ink containing C.I. Pigment Blue 15:3 are particularly preferably used. Inks that can be added to the ink set according to the present invention and used are not limited to the above-described inks.

The respective inks constituting the ink set according to the present invention can achieve a marked effect when they are applied to an ink jet recording method utilizing thermal energy. The reason for this is that the respective inks constituting the ink set according to the present invention have good ejection stability, so that a broader color reproduction range can be achieved even when ejection quantity is small.

The constitutions characterizing the green, blue and red inks constituting the ink set according to the present invention will be specifically described.

(Green Ink)

The green ink constituting the ink set according to the present invention contains C.I. Pigment Green 7 as a coloring material. The content (mass %) of C.I. Pigment Green 7 in the green ink is preferably 1.0 mass % or more to 10.0 mass % or less, further 2.0 mass % or more to 6.0 mass % or less with respect to the whole mass of the ink.

As the green ink constituting the ink set according to the present invention, is particularly preferably used the above-described aqueous ink according to the present invention. More specifically, the proportion of the Kα-line intensity of a chlorine atom to the Kα-line intensity of a bromine atom obtained by subjecting the green pigment contained in the green ink to X-ray fluorescence analysis is preferably 3.3 or more to 10.0 or less. At this time, the green ink preferably contains a polymer having weight average molecular weight within a range of from 2,000 or more to 5,000 or less as a polymer dispersing the green pigment.

(Blue Ink)

The blue ink constituting the ink set according to the present invention contains C.I. Pigment violet 23 as a coloring material. The content (mass %) of C.I. Pigment Violet 23 in the blue ink is preferably 0.1 mass % or more to 15.0 mass % or less, further 1.0 mass % or more to 10.0 mass % or less, particularly 1.0 mass % or more to 3.0 mass % or less with respect to the whole mass of the ink.

As the blue ink constituting the ink set according to the present invention, is preferably used an ink having the following light absorption characteristics. More specifically, the ink has maximum absorption wavelengths in a wavelength range of from 530 nm or more to 540 nm or less and a wavelength range of from 550 nm or more to 570 nm or less, respectively, and absorbances at these maximum absorption wavelengths preferably satisfy the following relationship. The relationship between an absorbance (A) at the maximum absorption wavelength located in the range of from 530 nm or more to 540 nm or less and an absorbance (B) at the maximum absorption wavelength located in the wavelength range of from 550 nm or more to 570 nm or less preferably satisfies the conditions of the following expression (1):

$$0.93 \leq (B)/(A) \leq 0.97 \qquad (1)$$

The blue ink satisfies the conditions of the expression (1), whereby the color developability of an image formed with the blue ink can be particularly improved.

(Red Ink)

The red ink constituting the ink set according to the present invention contains C.I. Pigment Red 149 as a coloring material. The content (mass %) of C.I. Pigment Red 149 in the red ink is preferably 1.0 mass % or more to 10.0 mass % or less, further 3.0 mass % or more to 5.0 mass % or less with respect to the whole mass of the ink.

When a magenta ink containing C.I. Pigment Red 122 is combined with the respective inks constituting the ink set according to the present invention to form an image, the magenta ink and the red ink constituting the ink set preferably satisfy the following conditions. More specifically, diluted inks obtained by respectively diluting the magenta ink and the red ink with water at the same rate are subjected to absorbance measurement. Absorbances at each wavelength are added up from the resultant absorption spectra of the respective diluted inks. This is referred to as an absorbance-added-up absorption spectrum. At this time, the relationship between a maximum absorbance (C) and a minimum absorbance (D) in a wavelength range of from 450 nm or more to 570 nm or less in the absorbance-added-up absorption spectrum preferably satisfies the conditions of the following expression (2):

$$0.7 \leq (D)/(C) \leq 1.0 \qquad (2)$$

The magenta ink and the red ink satisfy the conditions of the expression (2), whereby a color reproduction range in a red region, i.e., a color reproduction range of the first quadrant represented by the a*b* coordinate in the L*a*b* color space prescribed by CIE, can be particularly effectively widened.

(Dispersing System of Pigment)

The blue, red and green inks constituting the ink set according to the present invention are preferably inks obtained by dispersing a pigment used in each of the inks in an aqueous medium containing water or water and a water-soluble organic solvent. No particular limitation is imposed on a method of dispersing the pigment in the aqueous medium, and the same dispersing system as in the above-described aqueous ink (green-pigment-containing aqueous ink) of the present invention may be adopted. In this case, a dispersant used for dispersing the pigment may also be the same as the polymer used in the aqueous ink according to the present invention.

(Aqueous Medium and Other Additives)

The aqueous medium and other additives used in the blue, red and green inks constituting the ink set according to the present invention may be the same as the aqueous medium and other additives used in the aqueous ink according to the present invention. At this time, the contents of the aqueous medium and other additives may be the same as in the aqueous ink according to the present invention.

<Ink Jet Recording Method>

The ink according to the present invention and the respective inks constituting the ink set according to the present invention are particularly preferably used in an ink jet recording method that an ink is ejected by an ink jet recording method to conduct recording on a recording medium. Examples of the ink jet recording method include a method in which mechanical energy is applied to an ink to eject the ink, and a method in which thermal energy is applied to an ink to eject the ink. The ink according to the present invention and the respective inks constituting the ink set according to the present invention can achieve marked effects when they are used in the ink jet recording method utilizing thermal energy.

<Ink Cartridge>

The ink cartridge according to the present invention includes an ink storage portion storing the ink according to the present invention or the respective inks constituting the ink set according to the present invention.

<Recording Unit>

The recording unit according to the present invention includes an ink storage portion storing the ink according to the present invention or the respective inks constituting the ink set according to the present invention, and a recording head for ejecting each ink. When the recording unit has a recording head from which the ink is ejected by applying thermal energy to the ink, a marked effect can be achieved.

<Ink Jet Recording Apparatus>

The ink jet recording apparatus according to the present invention includes an ink storage portion storing the ink according to the present invention or the respective inks constituting the ink set according to the present invention, and a recording head for ejecting each ink. When the ink jet recording apparatus has a recording head from which the ink is ejected by applying thermal energy to the ink, a marked effect can be achieved.

The schematic construction of a mechanism part of the ink jet recording apparatus will hereinafter be described. The ink jet recording apparatus is constructed by a paper feeding part, a conveying part, a carriage part, a paper discharging part, a cleaning part and an outer facing part for protecting these parts and imparting designing ability from the roles of the respective mechanisms. Outlines of these parts will hereinafter be described.

Figure 2:
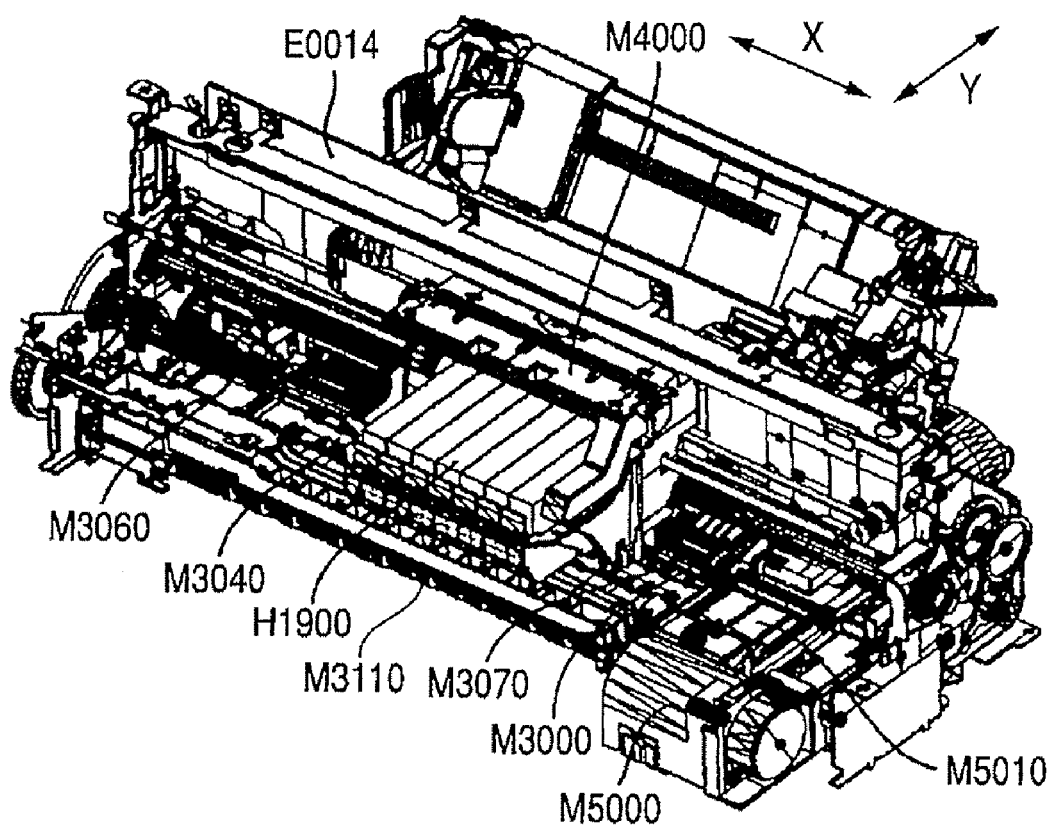
FIG. 2 is a perspective view of a mechanism part of the ink jet recording apparatus.
Figure 3:
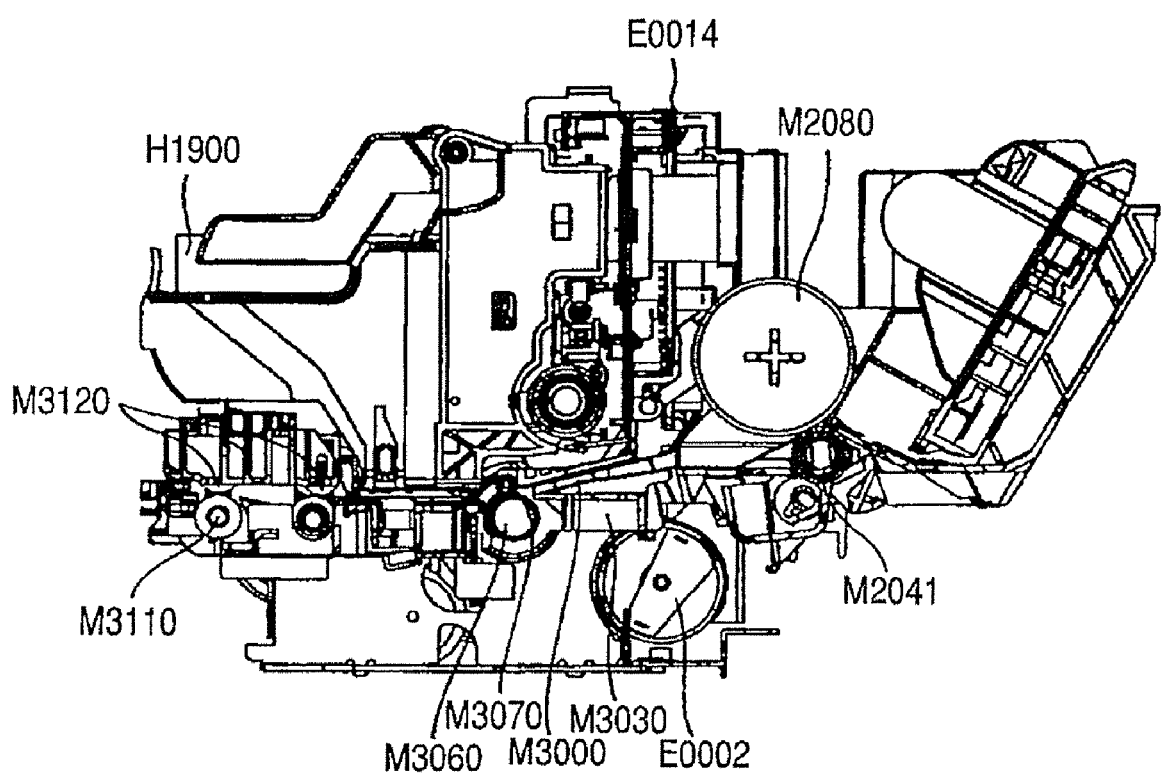
FIG. 3 is a sectional view of the ink jet recording apparatus.

FIG. 1 is a perspective view of the ink jet recording apparatus. FIGS. 2 and 3 are drawings illustrating the internal mechanism of the ink jet recording apparatus, in which FIG. 2 is a perspective view as viewed from the top right-hand, and FIG. 3 is a sectional side elevation of the ink jet recording apparatus.

Upon feeding of paper, a predetermined number of recording media in a paper feeding tray M2060 are sent to a nip part constructed by a paper feed roller M2080 and a separating roller M2041 (see FIGS. 1 and 3). The recording media are separated in the nip part, and only a recording medium located uppermost is conveyed. The recording medium sent to the conveying part is guided to a pinch roller holder M3000 and a paper guide flapper M3030 and sent to a pair of rolls of a conveying roller M3060 and a pinch roller M3070. The pair of rollers having the conveying roller M3060 and the pinch roller M3070 are rotated by driving of an LF motor E0002, and the recording medium is conveyed on a platen M3040 by this rotation (see FIGS. 2 and 3).

Upon forming of an image, a recording head H1001 (see FIG. 4) is arranged at an intended image forming position in the carriage part, and an ink is ejected on the recording medium according to a signal from an electric substrate E0014 (see FIG. 2). The detailed construction of the recording head H1001 will be described subsequently. While conducting recording by the recording head H1001, main scanning with which a carriage M4000 (see FIG. 2) scans in a row direction and secondary scanning with which the conveying roller M3060 (see FIGS. 2 and 3) conveys the recording medium in a line direction are alternately repeated, thereby forming an image on the recording medium.

Lastly, the recording medium is nipped and conveyed between a first paper discharging roller M3110 and a spur M3120 in the paper discharging part (see FIG. 3) and discharged on a paper discharging tray M3160 (see FIG. 1).

In the cleaning part, the recording head H1001 is cleaned. In the cleaning part, a pump M5000 (see FIG. 2) is operated in a state that a cap M5010 (see FIG. 2) has been brought into close contact with ejection orifices of the recording head H1001, whereby the ink is sucked from the recording head H1001. When the ink remaining in the cap M5010 is sucked in a state that the cap has been opened, sticking of the ink and other problems are prevented.

(Construction of Recording Head)

The construction of a head cartridge H1000 will be described (see FIG. 4). The head cartridge H1900 has a recording head H1001, a unit for installing an ink cartridge H1900 and a unit for feeding an ink from the ink cartridge H1900 to the recording head. The head cartridge H1000 is detachably installed on the carriage M4000 (see FIG. 2).

Figure 4:
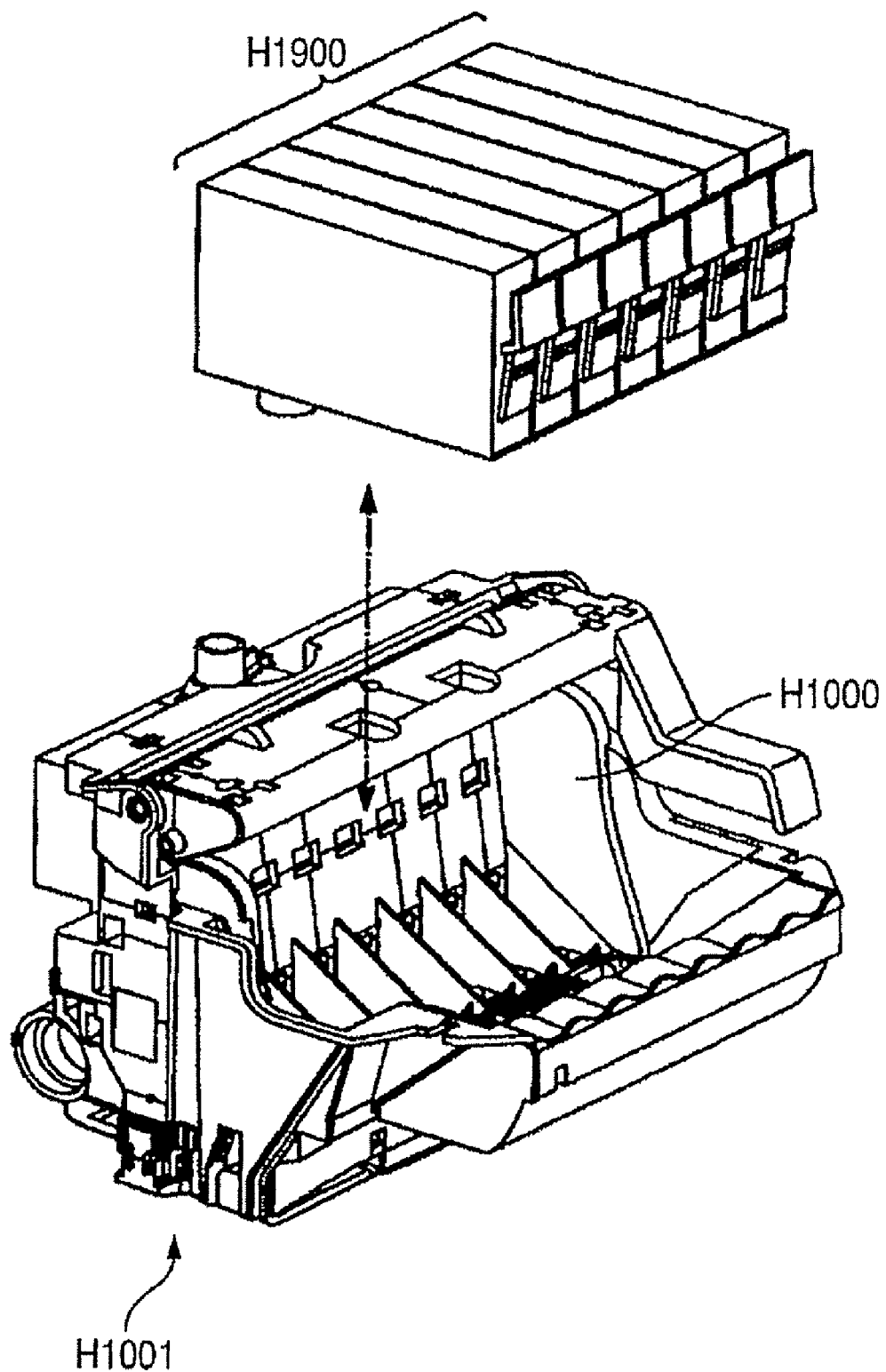
FIG. 4 is a perspective view illustrating a state that an ink cartridge is installed in a head cartridge.

FIG. 4 illustrates a state where the ink cartridge H1900 is installed in the head cartridge H1000. The ink jet recording apparatus forms an image with, for example, yellow, magenta, cyan, black, red, green and blue inks. Accordingly, ink cartridges H1900 for 7 colors are independently provided. The inks according to the present invention or the inks constituting the ink set are used as at least one ink of the inks described above. As illustrated in FIG. 4, each ink cartridge is detachably installed in the head cartridge H1000. The ink cartridge H1900 can be detachably installed in a state that the head cartridge H1000 has been installed in the carriage M4000 (see FIG. 2).

Figure 5:
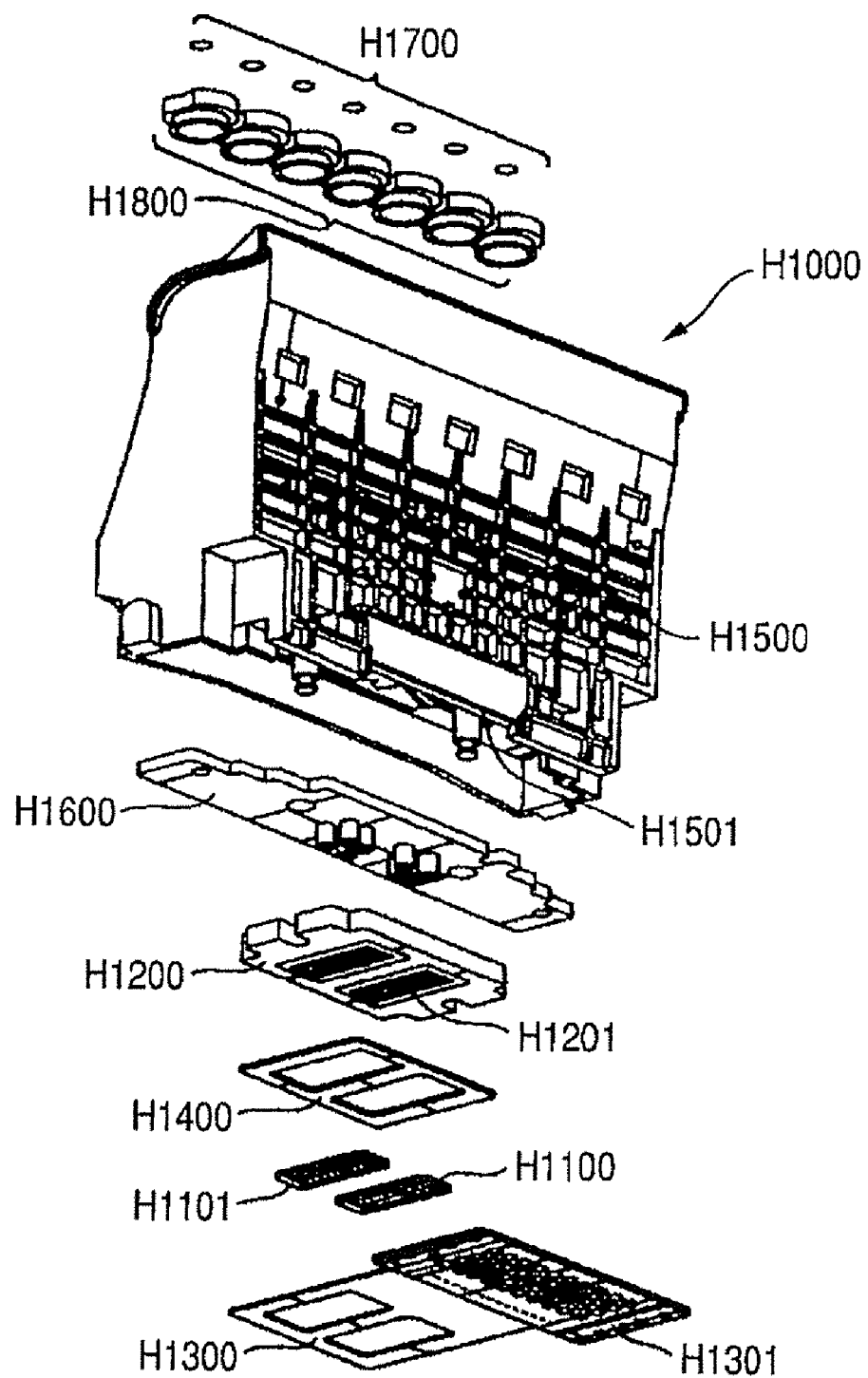
FIG. 5 is an exploded perspective view of the head cartridge.

FIG. 5 is an exploded perspective view of the head cartridge H1000. The head cartridge H1000 is constructed by recording element substrates, plates, an electric wiring substrate H1300, a tank holder H1500, a flow path forming member H1600, filters H1700 and seal rubber H1800. The recording element substrates include a first recording element substrate H1100 and a second recording element substrate H1101, and the plates include a first plate H1200 and a second plate H1400.

The first recording element substrate H1100 and the second recording element substrate H1101 are Si substrates, and a plurality of recording elements (nozzles) for ejecting an ink is formed in one surfaces thereof by a photolithographic technique. An electric wiring of Al for supplying electric power to each recording element is formed by a film forming technique. A plurality of ink flow paths corresponding to the individual recording elements is also formed by the photolithographic technique. Ink supply openings for supplying inks to a plurality of the ink flow paths are formed so as to open to a back surface.

Figure 6:
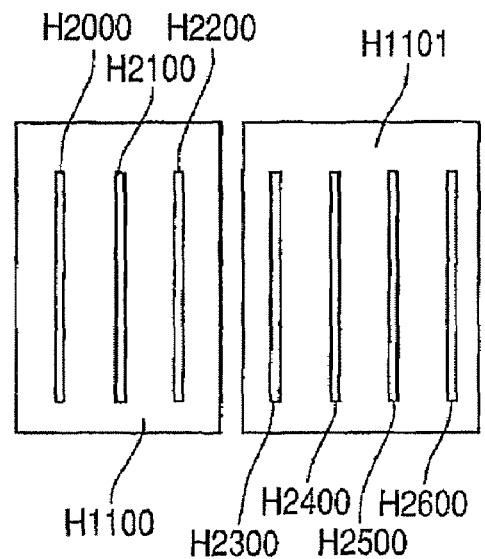
FIG. 6 is an elevational view illustrating recording element substrates in the head cartridge.

FIG. 6 is an enlarged elevational view illustrating the constructions of the first recording element substrate H1100 and the second recording element substrate H1101. Rows H2000 to H2600 (hereinafter also referred to as nozzle rows) of recording elements for respectively supplying different inks are formed in the substrates. In the first recording element substrate H1100, are formed nozzle rows for 3 colors of a nozzle row H2000 for the yellow ink, a nozzle row H2100 for the magenta ink and a nozzle row H2200 for the cyan ink. In the second recording element substrate H1101, are formed nozzle rows for 4 colors of a nozzle row H2300 for the red ink, a nozzle row H2400 for the black ink, a nozzle row H2500 for the green ink and a nozzle row H2600 for the blue ink.

Each nozzle row has 768 nozzles arranged at intervals of 1,200 dpi (dots/inch; referential value) and ejects about 2 picoliters of an ink. The opening area in each ejection orifice is preset to about 100 $\mu m^2$.

Description is given with reference to FIGS. 4 and 5. The first recording element substrate H1100 and second recording element substrate H1101 are bonded and fixed to the first plate H1200. In the first plate, are formed ink supply openings H1201 for supplying inks to the first recording element substrate H1100 and second recording element substrate H1101. Further, the second plate H1400 having openings is bonded and fixed to the first plate H1200. This second plate H1400 holds the electric wiring substrate H1300 so as to electrically connect the electric wiring substrate H1300 to the first recording element substrate H1100 and second recording element substrate H1101.

The electric wiring substrate H1300 applies electric signals for ejecting an ink from each nozzle formed in the first recording element substrate H1100 and second recording element substrate H1101. The electric wiring substrate H1300 has electric wirings corresponding to the first recording element substrate H1100 and second recording element substrate H1101, and an external signal input terminal H1301 located at the end of the electric wirings for receiving electric signals from the ink jet recording apparatus. The external signal input terminal H1301 is positioned and fixed on the back surface side of the tank holder H1500.

The flow path forming member H1600 is fixed to the tank holder H1500 for holding the ink cartridges H1900 by, for example, ultrasonic welding to form ink flow paths H1501 linking from the ink cartridges H1900 to the first plate H1200. The filters H1700 are provided at ends on the ink cartridge side of the ink flow paths H1501 linking to the ink cartridges H1900 so as to prevent invasion of dust from the outside. Sealing rubber H1800 is fitted to portions engaged with the ink cartridges H1900 so as to prevent evaporation of the inks from the engaged portions.

A tank holder part is bonded to a recording head part H1001 by, for example, adhesion, thereby forming the head cartridge H1000. The tank holder part includes the tank holder H1500, the flow path forming member H1600, the filters H1700 and the sealing rubber H1800. The recording head part H1001 includes the first recording element substrate H1100, the second recording element substrate H1101, the first plate H1200, the electric wiring substrate H1300 and the second plate H1400.

The recording head of the thermal ink jet system that recording is conducted using electrothermal converters (recording elements), which generate thermal energy for causing an ink to cause film boiling corresponding to an electric signal, has been described as an embodiment of the recording head herein. Typical construction and principles thereof are those which perform recording by using fundamental principles as disclosed in, for example, U.S. Pat. Nos. 4,723,129 and 4,740,796. This system is applicable to any of the so-called On-Demand type and continuous type.

In particular, the thermal ink jet system is effectively applied to the On-Demand type. In the case of the On-Demand type, at least one driving signal, which corresponds to recording information and gives a rapid temperature rise exceeding nuclear boiling, is applied to an electrothermal converter arranged corresponding to a liquid path, in which a liquid is retained, thereby causing the electrothermal converter to generate thermal energy to cause film boiling in the ink. As a result, a bubble can be formed in the ink in response to the driving signal in relation of one to one. The ink is ejected through an ejection opening by the growth-contraction of this bubble to form at least one droplet. When the driving signal is applied in the form of a pulse, the growth-contraction of the bubble is suitably conducted in a moment, so that the ejection of the ink excellent in responsiveness in particular can be achieved. It is therefore favorable to use such pulsed signals.

The inks according to the present invention and the respective inks constituting the ink set according to the present invention may also be preferably used in an ink jet recording apparatus utilizing mechanical energy as will be described below, not limited to the thermal ink jet system. The ink jet recording apparatus of this system includes a nozzle-forming substrate having a plurality of nozzles, pressure-generating elements having a piezoelectric material and an electrically conductive material provided in an opposing relation to the nozzles, and an ink filled around the pressure-generating elements, in which the pressure-generating elements are displaced by voltage applied to eject the ink from the nozzles.

The ink jet recording apparatus are not limited to the apparatus as described above in which the head and the ink cartridge are separately provided. Therefore, a device in which these members are integrally formed may also be used. The ink cartridge may be separably or unseparably installed integrally in a recording head and mounted on a carriage, or may be provided at a fixing site of an ink jet recording apparatus to supply an ink to a recording head through an ink supply member such as a tube. When a mechanism for applying a favorable negative pressure to a recording head is provided in an ink cartridge, the following arrangements may preferably be adopted. More specifically, examples thereof include an arrangement in which an absorbing member is arranged in an ink storage portion of the ink cartridge, and an arrangement having a flexible ink-storing bag and a spring part for applying biasing force to the bag in a direction expanding the internal volume of the bag. The ink jet recording apparatus may adopt a recording system of such serial type as described above, or a line printer type that recording elements are arranged over a range corresponding to the overall width of a recording medium.

EXAMPLES

The present invention will hereinafter be described more specifically by the following Examples and Comparative Examples. However, the present invention is not limited to these examples unless going beyond the gist of the present invention. Incidentally, part" or "parts" and "%" as will be used below are based on mass unless expressly noted.

<Preparation of Green Pigment>

(Preparation of Green Pigment A)

In a reactor equipped with a stirrer and a halogen gas inlet tube, were mixed and heated 180 g of aluminum chloride and 42 g of sodium chloride at 160° C. for 5 hours. After the mixture was additionally stirred for 2 hours, the temperature was raised to 100° C., and 60 g of copper phthalocyanine was added. Chlorine gas and bromine gas in a proportion of 10:1 were introduced into the reactor at a flow rate of 9 g/h to halogenate the copper phthalocyanine. The resultant substance was discharged into water, washed and dried to obtain 80 g of Green Pigment A. The thus-obtained Green Pigment A was subjected to X-ray fluorescence analysis to calculate out the $K\alpha$-line intensity of the chlorine atom and the $K\alpha$-line intensity of the bromine atom, thereby determining the proportion of the $K\alpha$-line intensity of the chlorine atom to the $K\alpha$-line intensity of the bromine atom (($K\alpha$-line intensity of chlorine atom)/($K\alpha$-line intensity of bromine atom)). The result is shown in Table 1.

(Preparation of Green Pigments B, C, D and E)

Green Pigments B, C, D and E different in the contents of the chlorine and bromine atoms were prepared in the same manner as in Preparation of Green Pigment A except that the proportion of the chlorine gas to the bromine gas was changed. Incidentally, the contents of the chlorine and bromine atoms in the green inks were changed by suitably changing the mixing proportion of the chlorine gas and bromine gas used upon the halogenation of copper phthalocyanine. In general, the proportion of the bromine atom substituting on the copper phthalocyanine skeleton is increased by increasing the content of the bromine gas in the mixed gas of the chlorine gas and bromine gas. Each of the thus-obtained Green Pigments B, C, D and E was subjected to X-ray fluorescence analysis to calculate out the $K\alpha$-line intensity of the chlorine atom and the $K\alpha$-line intensity of the bromine atom, thereby determining the proportion of the $K\alpha$-line intensity of the chlorine atom to the $K\alpha$-line intensity of the bromine atom (($K\alpha$-line intensity of chlorine atom)/($K\alpha$-line intensity of bromine atom)). The results are shown in Table 1.

TABLE 1

| | Results of X-ray fluorescence analysis |
|---|---|
| | $K\alpha$-line intensity ratio between chlorine atom and bromine atom (*1) |
| Green Pigment A | 10 |
| Green Pigment B | 3.3 |
| Green Pigment C | 4 |
| Green Pigment D | 11 |
| Green Pigment E | 2.5 |

(*1) ($K\alpha$-line intensity of chlorine atom)/($K\alpha$-line intensity of bromine atom)

<Preparation of Green Pigment Dispersion>

Each of the green pigment obtained above was used to prepare each green pigment dispersion according to the following procedure and composition.

(Preparation of Green Pigment Dispersion 1)

15 parts of Green Pigment A, 7.5 parts of a dispersant and 77.5 parts of ion-exchanged water were mixed to prepare a liquid pigment dispersion. As the dispersant, was used Polymer A obtained by neutralizing with an aqueous solution of potassium hydroxide an AB type block polymer (acid value: 250, weight average molecular weight: 6,000) synthesized according to a method known per se in the art by using benzyl methacrylate and methacrylic acid as raw materials. This liquid pigment dispersion was charged into a batch type vertical sand mill (manufactured by AIMEX), and 85 parts of zirconia beads having a diameter of 0.3 mm were filled to conduct dispersion for 3 hours under cooling. The resultant dispersion was then centrifuged to remove undispersed matter including coarse particles. The thus-treated dispersion was filtered under pressure through a microfilter (product of Fuji Photo Film Co., Ltd.) having a pore size of 3.0 μm to prepare Green Pigment Dispersion 1 having a solid pigment content of 10 mass % and a polymer content of 5 mass %.

(Preparation of Green Pigment Dispersion 2)

Green Pigment Dispersion 2 was prepared in the same manner as in Green Pigment Dispersion 1 except that Green Pigment B was used in place of Green Pigment A. The resultant Green Pigment Dispersion 2 had a solid pigment content of 10 mass % and a polymer content of 5 mass %.

(Preparation of Green Pigment Dispersion 3)

Green Pigment Dispersion 3 was prepared in the same manner as in Green Pigment Dispersion 1 except that Polymer A of the dispersant was changed. Incidentally, As the dispersant, was used Polymer B obtained by neutralizing with an aqueous solution of potassium hydroxide an AB type block polymer (acid value: 250, weight average molecular weight: 5,000) synthesized according to a method known per se in the art by using benzyl methacrylate and methacrylic acid as raw materials. The resultant Green Pigment Dispersion 3 had a solid pigment content of 10 mass % and a polymer content of 5 mass %.

(Preparation of Green Pigment Dispersion 4)

Green Pigment Dispersion 4 was prepared in the same manner as in Green Pigment Dispersion 1 except that Polymer A of the dispersant was changed. Incidentally, As the dispersant, was used Polymer C obtained by neutralizing with an aqueous solution of potassium hydroxide an AB type block polymer (acid value: 250, weight average molecular weight: 2,000) synthesized according to a method known per se in the art by using benzyl methacrylate and methacrylic acid as raw materials. The resultant Green Pigment Dispersion 4 had a solid pigment content of 10 mass % and a polymer content of 5 mass %.

(Preparation of Green Pigment Dispersion 5)

Green Pigment Dispersion 5 was prepared in the same manner as in Green Pigment Dispersion 1 except that 15 parts of Green Pigment B, 6 parts of Polymer B, and 79 parts of ion-exchanged water were used. The resultant Green Pigment Dispersion 5 had a solid pigment content of 10 mass % and a polymer content of 4 mass %.

(Preparation of Green Pigment Dispersion 6)

Green Pigment Dispersion 6 was prepared in the same manner as in Green Pigment Dispersion 1 except that 15 parts of Green Pigment B, 16.5 parts of Polymer B, and 68.5 parts of ion-exchanged water were used. The resultant Green Pigment Dispersion 6 had a solid pigment content of 10 mass % and a polymer content of 11 mass %.

(Preparation of Green Pigment Dispersion 7)

Green Pigment Dispersion 7 was prepared in the same manner as in Green Pigment Dispersion 1 except that 15 parts of Green Pigment C, 7.5 parts of Polymer A, and 77.5 parts of ion-exchanged water were used. The resultant Green Pigment Dispersion 7 had a solid pigment content of 10 mass % and a polymer content of 5 mass %.

(Preparation of Green Pigment Dispersion 8)

Green Pigment Dispersion 8 was prepared in the same manner as in Green Pigment Dispersion 1 except that Polymer A of the dispersant was changed. Incidentally, As the dispersant, was used Polymer D obtained by neutralizing with an aqueous solution of potassium hydroxide an AB type block polymer (acid value: 250, weight average molecular weight: 1,500) synthesized according to a method known per se in the art by using benzyl methacrylate and methacrylic acid as raw materials. The resultant Green Pigment Dispersion 8 had a solid pigment content of 10 mass % and a polymer content of 5 mass %.

(Preparation of Green Pigment Dispersion 9)

Green Pigment Dispersion 9 was prepared in the same manner as in Green Pigment Dispersion 1 except that Polymer A of the dispersant was changed. Incidentally, As the dispersant, was used Polymer E obtained by neutralizing with an aqueous solution of potassium hydroxide a random polymer (acid value: 250, weight average molecular weight: 5,000) synthesized according to a method known per se in the art by using benzyl methacrylate and methacrylic acid as raw materials. The resultant Green Pigment Dispersion 9 had a solid pigment content of 10 mass % and a polymer content of 5 mass %.

(Preparation of Green Pigment Dispersion 10)

Green Pigment Dispersion 10 was prepared in the same manner as in Green Pigment Dispersion 1 except that 15 parts of Green Pigment A, 3 parts of Polymer B, and 87 parts of ion-exchanged water were used. The resultant Green Pigment Dispersion 10 had a solid pigment content of 10 mass % and a polymer content of 2 mass %.

(Preparation of Green Pigment Dispersion 11)

Green Pigment Dispersion 11 was prepared in the same manner as in Green Pigment Dispersion 1 except that 15 parts of Green Pigment D, 7.5 parts of Polymer A, and 77.5 parts of ion-exchanged water were used. The resultant Green Pigment Dispersion 11 had a solid pigment content of 10 mass % and a polymer content of 5 mass %.

(Preparation of Green Pigment Dispersion 12)

Green Pigment Dispersion 12 was prepared in the same manner as in Green Pigment Dispersion 1 except that 15 parts of Green Pigment E, 7.5 parts of Polymer A, and 77.5 parts of ion-exchanged water were used. The resultant Green Pigment Dispersion 12 had a solid pigment content of 10% and a polymer content of 5%.

(Preparation of Green Pigment Dispersion 13)

10 parts of Green Pigment A, 9 parts of Polymer B and 81.0 parts of ion-exchanged water were mixed to prepare a liquid pigment dispersion. This liquid pigment dispersion was charged into a recirculating bead mill, and 85 parts of zirconia beads having a diameter of 0.3 mm were put therein to conduct dispersion for 3 hours at a peripheral speed of 4 m/sec under cooling. The resultant dispersion was then centrifuged to remove undispersed matter including coarse particles. The thus-treated dispersion was filtered under pressure through a microfilter (product of Fuji Photo Film Co., Ltd.) having a pore size of 3.0 μm to prepare Green Pigment Dispersion 13 having a solid pigment content of 10 mass % and a polymer content of 9 mass %.

(Preparation of Green Pigment Dispersion 14)

Green Pigment Dispersion 14 was prepared in the same manner as in Green Pigment Dispersion 2 except that Green Pigment A was changed to C.I. Pigment Green 36 (product name: LIONOL GREEN 6YK; product of Toyo Ink Mfg. Co., Ltd.), and the dispersing time was changed to 5 hours. The resultant Green Pigment Dispersion 14 had a solid pigment content of 5 mass % and a polymer content of 9 mass %. Incidentally, C.I. Pigment Green 36 was subjected to X-ray fluorescence analysis to calculate out the Kα-line intensity of the chlorine atom and the Kα-line intensity of the bromine atom, thereby determining the proportion of the Kα-line intensity of the chlorine atom to the Kα-line intensity of the bromine atom. As a result, the proportion ((Kα-line intensity of chlorine atom)/(Kα-line intensity of bromine atom)) was 0.06.

<Preparation of Respective Color Pigment Dispersions>

Each of commercially available pigments was used to prepare each color pigment dispersion according to the following procedure and composition.

(Preparation of Blue Pigment Dispersion 1)

Blue Pigment Dispersion 1 was prepared in the same manner as in Green Pigment Dispersion 13 except that C.I. Pigment Violet 23 (product name: Hostaperm Violet RL SP; product of Clariant Co.) was used in place of Green Pigment A. The resultant Blue Pigment Dispersion 1 had a solid pigment content of 10 mass % and a polymer content of 9 mass %.

(Preparation of Blue Pigment Dispersion 2)

Blue Pigment Dispersion 2 was prepared in the same manner as in Green Pigment Dispersion 13 except that C.I. Pigment Blue 60 (product name: Micracet Blue R; product of Ciba Speciality Chemicals Co.) was used in place of Green Pigment A. The resultant Blue Pigment Dispersion 2 had a solid pigment content of 10 mass % and a polymer content of 9 mass %.

(Preparation of Red Pigment Dispersion 1)

Red Pigment Dispersion 1 was prepared in the same manner as in Green Pigment Dispersion 13 except that C.I. Pigment Red 149 (product name: Hostaprint Red B 32; product of Clariant Co.) was used in place of Green Pigment A. The resultant Red Pigment Dispersion 1 had a solid pigment content of 10 mass % and a polymer content of 9 mass %.

(Preparation of Red Pigment Dispersion 2)

Red Pigment Dispersion 2 was prepared in the same manner as in Green Pigment Dispersion 13 except that C.I. Pigment Red 177 (product name: CROMOPHTAL RED A2B; product of Ciba Speciality Chemicals Co.) was used in place of Green Pigment A. The resultant Red Pigment Dispersion 2 had a solid pigment content of 10 mass % and a polymer content of 9 mass %.

(Preparation of Yellow Pigment Dispersion 1)

10 parts of a pigment, 9 parts of a dispersant and 81 parts of ion-exchanged water were mixed to prepare a liquid pigment dispersion. As the pigment, was used C.I. Pigment Yellow 74 (product name: Hansa Brilliant Yellow 5GX; product of Clariant Co.). As the dispersant, was used Polymer F obtained by neutralizing with an aqueous solution of potassium hydroxide a random polymer (acid value: 202, weight average molecular weight: 6,500) synthesized according to a method known per se in the art by using styrene, butyl acrylate and acrylic acid as raw materials. This liquid pigment dispersion was charged into a batch type vertical sand mill (manufactured by AIMEX), and 150 parts of zirconia beads having a diameter of 0.3 mm were put therein to conduct dispersion for 12 hours under cooling. The resultant dispersion was then centrifuged to remove coarse particles. The thus-treated dispersion was filtered under pressure through a microfilter (product of Fuji Photo Film Co., Ltd.) having a pore size of 3.0 μm to prepare Yellow Pigment Dispersion 1 having a solid pigment content of 10 mass % and a polymer content of 9 mass %.

(Preparation of Magenta Pigment Dispersion 1)

Magenta Pigment Dispersion 1 was prepared in the same manner as in Yellow Pigment Dispersion 1 except that C.I. Pigment Red 122 (product name: Hostaperm Pink E; product of Clariant Co.) was used in place of C.I. Pigment Yellow 74, and the dispersing time was changed to 3 hours. The resultant Magenta Pigment Dispersion 1 had a solid pigment content of 10 mass % and a polymer content of 9 mass %.

(Preparation of Cyan Pigment Dispersion 1)

Cyan Pigment Dispersion 1 was prepared in the same manner as in Yellow Pigment Dispersion 1 except that C.I. Pigment Blue 15:3 (product name: IRGALITE Blue 8700; product of Ciba Speciality Chemicals Co.) was used in place of C.I. Pigment Yellow 74. The resultant Cyan Pigment Dispersion 1 had a solid pigment content of 10 mass % and a polymer content of 9 mass %.

<Preparation of Inks>

After the components shown in Table 2 and Table 3 were mixed and sufficiently stirred, the resultant respective mixtures were filtered under pressure through a microfilter (product of Fuji Photo Film Co., Ltd.) having a pore size of 1.0 μm, thereby preparing Inks 1 to 17. Incidentally, Inks 1 to 14 are inks of Examples of the present invention, and Inks 15 to 17 are inks of Comparative Examples. In Tables 2 and 3, Polymer MW means a weight average molecular weight of a polymer.

TABLE 2

Compositions of Inks 1 to 8 (unit: %)

| | Ink | | | | | | | |
|---|---|---|---|---|---|---|---|---|
| | 1 | 2 | 3 | 4 | 5 | 6 | 7 | 8 |
| Green Pigment Dispersion 1 (Green Pigment A, block polymer polymer MW = 6,000) | 40.0 | | | | | | | 40.0 |
| Green Pigment Dispersion 2 (Green Pigment B, block polymer polymer MW = 6,000) | | 40.0 | | | | | | |
| Green Pigment Dispersion 3 (Green Pigment A, block polymer polymer MW = 5,000) | | | 40.0 | | | | | |
| Green Pigment Dispersion 4 (Green Pigment A, block polymer polymer MW = 2,000) | | | | 40.0 | | | | |
| Green Pigment Dispersion 5 (Green Pigment B, block polymer polymer MW = 5,000) | | | | | 40.0 | | | |
| Green Pigment Dispersion 6 (Green Pigment A, block polymer polymer MW = 5,000) | | | | | | 40.0 | | |
| Green Pigment Dispersion 7 (Green Pigment C, block polymer polymer MW = 6,000) | | | | | | | 40.0 | |
| Glycerol | 7.0 | 6.0 | 7.0 | 6.0 | 7.0 | 7.0 | 6.0 | 7.0 |
| Diethylene glycol | 5.0 | 3.0 | 5.0 | 3.0 | 5.0 | 5.0 | 3.0 | 5.0 |
| 2-Pyrrolidone | 1.0 | 3.0 | 1.0 | 3.0 | 1.0 | 1.0 | 3.0 | 1.0 |
| Polyethylene glycol (*1) | 5.0 | 5.0 | 5.0 | 5.0 | 5.0 | 5.0 | 5.0 | |
| Acetylenol EH (*2) | 1.0 | 1.0 | 1.0 | 1.0 | 1.0 | 1.0 | 1.0 | 1.0 |
| Water | 41.0 | 42.0 | 41.0 | 42.0 | 41.0 | 41.0 | 42.0 | 46.0 |
| Pigment content (mass %) | 4.0 | 4.0 | 4.0 | 4.0 | 4.0 | 4.0 | 4.0 | 4.0 |
| Polymer content (mass %) | 2.0 | 2.0 | 2.0 | 2.0 | 1.6 | 4.4 | 2.0 | 2.0 |

(*1) Weight average molecular weight: 1,000
(*2) Acetylene glycol ethylene oxide adduct (surfactant; product of Kawaken Fine Chemicals Co., Ltd.)

TABLE 3

Compositions of Inks 9 to 17 (unit: %)

| | Ink | | | | | | | | |
|---|---|---|---|---|---|---|---|---|---|
| | 9 | 10 | 11 | 12 | 13 | 14 | 15 | 16 | 17 |
| Green Pigment Dispersion 3 (Green Pigment A, block polymer polymer MW = 5,000) | | | | | | 18.0 | | | |
| Green Pigment Dispersion 8 (Green Pigment A, block polymer polymer MW = 1,500) | 40.0 | | | | | | | | |
| Green Pigment Dispersion 9 (Green Pigment A, random polymer polymer MW = 5,000) | | 40.0 | | | | | | | |
| Green Pigment Dispersion 10 (Green Pigment A, block polymer polymer MW = 5,000) | | | 40.0 | 40.0 | 40.0 | | | | |
| Green Pigment Dispersion 11 (Green Pigment D, block polymer polymer MW = 6,000) | | | | | | | 40.0 | | |
| Green Pigment Dispersion 12 (Green Pigment E, block polymer polymer MW = 6,000) | | | | | | | | 40.0 | |
| Green Pigment Dispersion 14 (C.I. Pigment Green 36, block polymer polymer MW = 5,000) | | | | | | | | | 40.0 |
| Polymer B | | | | 0.1 | 1.0 | 1.0 | | | |
| Glycerol | 7.0 | 7.0 | 7.0 | 7.0 | 7.0 | 7.0 | 7.0 | 7.0 | 7.0 |
| Diethylene glycol | 5.0 | 5.0 | 5.0 | 5.0 | 5.0 | 5.0 | 5.0 | 5.0 | 5.0 |
| 2-Pyrrolidone | 1.0 | 1.0 | 1.0 | 1.0 | 1.0 | 1.0 | 1.0 | 1.0 | 1.0 |
| Polyethylene glycol (*1) | 5.0 | 5.0 | 5.0 | 5.0 | 5.0 | 5.0 | 5.0 | 5.0 | 5.0 |
| Acetylenol EH (*2) | 1.0 | 1.0 | 1.0 | 1.0 | 1.0 | 1.0 | 1.0 | 1.0 | 1.0 |
| Water | 41.0 | 41.0 | 41.0 | 40.9 | 40.0 | 62.0 | 41.0 | 41.0 | 41.0 |
| Pigment content (mass %) | 4.0 | 4.0 | 4.0 | 4.0 | 4.0 | 1.8 | 4.0 | 4.0 | 4.0 |
| Polymer content (mass %) | 2.0 | 2.0 | 0.8 | 0.9 | 1.8 | 0.9 | 2.0 | 2.0 | 2.0 |

(*1) Weight average molecular weight: 1,000
(*2) Acetylene glycol ethylene oxide adduct (surfactant; product of Kawaken Fine Chemicals Co., Ltd.)

<Evaluation of Green Ink>

(1) Ejection Stability

Each of the inks obtained above was charged into an ink cartridge, and the ink cartridge was installed at a position of a cyan ink of an ink jet recording apparatus "PIXUS 990i" (manufactured by Canon Inc.) that ejects an ink by an action of thermal energy and was modified so as to conduct one-direction recording. Thereafter, solid images of 2 cm×8 cm were recorded on PPC Paper Office Planner (product of Canon Inc.) with the recording duty changed stepwise to 25, 50, 75 and 100%. At this time, a printer driver selected a default mode. The condition of ejection failure, and the densities and condition of recording unevenness of the solid images thus obtained were visually observed to evaluate the ink as to the ejection stability. The evaluation criteria of the ejection stability are as follows. The results of the evaluation are shown in Table 4.

AA: No ejection failure occurs up to 100% of the recording duty, and no recording unevenness is observed at all recording duties;

A: No ejection failure occurs up to 100% of the recording duty, but recording unevenness due to mis-alignment of impact position somewhat occurs in the image of 25% of the recording duty;

B: No ejection failure occurs up to 100% of the recording duty, but recording unevenness due to mis-alignment of impact position and lowering of image density due to reduction in ejection volume occur in the image of 25% of the recording duty;

C: Ejection failure occurs at 100% of the recording duty, or no ejection failure occurs in all nozzles, but blurring occurs on the solid image.

(2) Storage Stability

Each of the inks obtained above was placed in a glass bottle, and the bottle was closely sealed and stored for 3 months in an oven kept to 60° C. The glass bottle was then taken out of the oven and left to stand until the temperature of the bottle was cooled to ordinary temperature. The bottle was stood with the stopper of the bottle down to visually observe the amount and size of deposits on the bottom of the bottle. The ink was evaluated as to storage stability by difference in the amount and size of the deposits between before and after the storage. In addition, the viscosity, surface tension, average particle size of the pigment and light absorption characteristics of each ink were measured according to the methods known per se in the art to evaluate the ink as to the storage stability. The evaluation criteria of the storage stability are as follows. The results of the evaluation are shown in Table 4.

AA: The amount and size of deposits remained unchanged compared with before the storage at 60° C.;

A: No increase in the amount of deposits was observed compared with before the storage at 60° C., but the size somewhat enlarged;

B: The amount of deposits somewhat increased compared with before the storage at 60° C., but the viscosity, surface tension, average particle size and light absorption characteristics of the ink scarcely changed;

C: The amount of deposits greatly increased compared with before the storage at 60° C., and any of the viscosity, surface tension, average particle size and light absorption characteristics of the ink changed compared with before the storage at 60° C.

TABLE 4

Results of evaluation

|  |  | Ink | Ejection stability | Storage stability |
|---|---|---|---|---|
| Example | 1 | 1 | A | A |
|  | 2 | 2 | A | A |
|  | 3 | 3 | AA | AA |
|  | 4 | 4 | AA | AA |
|  | 5 | 5 | AA | A |
|  | 6 | 6 | A | AA |
|  | 7 | 7 | AA | AA |
|  | 8 | 8 | B | A |
|  | 9 | 9 | A | B |
|  | 10 | 10 | A | A |
|  | 11 | 11 | A | B |
|  | 12 | 12 | AA | AA |
|  | 13 | 13 | AA | AA |
|  | 14 | 14 | A | AA |
| Comparative Example | 1 | 15 | A | C |
|  | 2 | 16 | C | B |
|  | 3 | 17 | C | C |

<Preparation of Inks>

After the components shown in Table 5 were mixed and sufficiently stirred, the resultant respective mixtures were filtered under pressure through a microfilter (product of Fuji Photo Film Co., Ltd.) having a pore size of 1.0 μm, thereby preparing Inks 18 to 26.

With respect to a diluted ink obtained by 1500-times (by mass) diluting Ink 18 with ion-exchanged water, the absorbance was measured in a wavelength range of from 400 nm or more to 700 nm or less using a spectrophotometer (trade name: U-3300, manufactured by Hitachi Ltd.). As a result, the absorbance (A) at the maximum absorption wavelength located in the range of from 530 nm or more to 540 nm or less was 1.01, and the absorbance (B) at the maximum absorption wavelength located in the wavelength range of from 550 nm or more to 570 nm or less was 0.97. Accordingly, the value of (B)/(A) was 0.96 and satisfied the conditions of the following expression (1):

$$0.93 \leq (B)/(A) \leq 0.97 \tag{1}$$

With respect to diluted inks obtained by respectively 1000-times diluting Ink 22 and Ink 25 with ion-exchanged water, the absorbance was measured using the spectrophotometer (trade name: U-3300, manufactured by Hitachi Ltd.). Absorbances at each wavelength were added up from the resultant absorption spectra of the respective diluted inks. This is referred to as an absorbance-added-up absorption spectrum. At this time, in the absorbance-added-up absorption spectrum, the maximum absorbance (C) and the minimum absorbance (D) in a wavelength range of from 450 nm or more to 570 nm or less were 1.91 and 1.61, respectively. Accordingly, the value of (D)/(C) was 0.96 and satisfied the conditions of the following expression (2):

$$0.7 \leq (D)/(C) \leq 1.0 \tag{2}$$

TABLE 5

Compositions of Inks 18 to 26 (unit: %)

| | Ink | | | | | | | | |
|---|---|---|---|---|---|---|---|---|---|
| | 18 | 19 | 20 | 21 | 22 | 23 | 24 | 25 | 26 |
| Blue Pigment Dispersion 1 (C.I. Pigment Violet 23, block polymer polymer MW = 5,000) | 20.0 | | | | | | | | |
| Blue Pigment Dispersion 2 (C.I. Pigment Blue 60, block polymer polymer MW = 5,000) | | 20.0 | | | | | | | |
| Green Pigment Dispersion 13 (Green Pigment A, block polymer polymer MW = 5,000) | | | 30.0 | | | | | | |
| Green Pigment Dispersion 14 (C.I. Pigment Green 36, block polymer polymer MW = 5,000) | | | | 30.0 | | | | | |
| Red Pigment Dispersion 1 (C.I. Pigment Red 149, block polymer polymer MW = 5,000) | | | | | 40.0 | | | | |
| Red Pigment Dispersion 2 (C.I. Pigment Red 177, block polymer polymer MW = 5,000) | | | | | | | | 40.0 | |

TABLE 5-continued

Compositions of Inks 18 to 26 (unit: %)

| | Ink | | | | | | | | |
|---|---|---|---|---|---|---|---|---|---|
| | 18 | 19 | 20 | 21 | 22 | 23 | 24 | 25 | 26 |
| Yellow Pigment Dispersion 1 (C.I. Pigment Yellow 74, random polymer polymer MW = 6,500) | | | | | | | 50.0 | | |
| Magenta Pigment Dispersion 1 (C.I. Pigment Red 122, random polymer polymer MW = 6,500) | | | | | | | | 40.0 | |
| Cyan Pigment Dispersion 1 (C.I. Pigment Blue 15:3, random polymer polymer MW = 6,500) | | | | | | | | | 30.0 |
| Glycerol | 7.0 | 7.0 | 7.0 | 7.0 | 9.0 | 9.0 | | 9.0 | 7.0 |
| 2-Pyrrolidone | 5.0 | 5.0 | 1.0 | 1.0 | | | | | 5.0 |
| 1,2-Hexanediol | | | | | | | 3.0 | | |
| Ethylene glycol | | | | | | | | | 2.0 |
| Diethylene glycol | 3.0 | | 5.0 | 5.0 | 6.0 | 6.0 | | 6.0 | |
| Polyethylene glycol (*1) | 3.0 | 3.0 | 5.0 | 5.0 | 5.0 | 5.0 | 4.0 | 5.0 | 3.0 |
| Acetylenol EH (*2) | 1.0 | 1.0 | 1.0 | 1.0 | 1.0 | 1.0 | 1.0 | 1.0 | 1.0 |
| Water | 61.0 | 64.0 | 51.0 | 51.0 | 39.0 | 39.0 | 42.0 | 39.0 | 52.0 |

(*1) Weight average molecular weight: 1,000
(*2) Acetylene glycol ethylene oxide adduct (surfactant; product of Kawaken Fine Chemicals Co., Ltd.)

<Combinations of Inks Constituting Ink Sets of Example 15 to 16 and Comparative Examples 4 to 7>

Inks 15, 18 to 23 obtained above were used according to combinations shown in Table 6 to provide ink sets of Example 15 to 16 and Comparative Examples 4 to 7.

TABLE 6

| | Inks constituting ink sets | | |
|---|---|---|---|
| | Blue ink | Green ink | Red ink |
| Example 15 | Ink 18 | Ink 20 | Ink 22 |
| Example 16 | Ink 18 | Ink 15 | Ink 22 |
| Comp. Example 4 | Ink 19 | Ink 21 | Ink 23 |
| Comp. Example 5 | Ink 18 | Ink 21 | Ink 22 |
| Comp. Example 6 | Ink 19 | Ink 20 | Ink 22 |
| Comp. Example 7 | Ink 18 | Ink 20 | Ink 23 |

<Evaluation of Ink Sets of Example 15 to 16 and Comparative Examples 4 to 7>

The respective inks constituting the ink sets of Example 15 to 16 and Comparative Examples 4 to 7 were charged into ink cartridges, and the ink cartridges were installed in an ink jet recording apparatus "PIXUS 990i" (manufactured by Canon Inc.) that ejects an ink by an action of thermal energy and was modified so as to conduct one-direction recording. A color chart of ISO/JIS-SCID High-Definition Color Digital Standard Image was then recorded. Incidentally, recording conditions and a recording medium are as follows.

Recording Conditions

Kind of paper: Prophoto Paper

Printing quality: Beautiful

Color adjustment: Automatic.

Recording Medium

Professional Photo Paper PR-101 (product of Canon Inc.).

(1) Color Reproduction Range

With respect to the images obtained above, a* and b* values in the L*a*b* color space prescribed by CIE were measured by means of Spectrolino (manufactured by Gretag Macbeth Co.) to plot the a* and b* values. The image formed with the ink set of Example 15 and 16 was compared as to color area with each of the images formed with the ink sets of Comparative Examples 4 to 7. As a result, the area of the color space of the image formed with the ink set of Example 15 and 16 was far larger than the area of the color space of each of the images formed with the ink sets of Comparative Examples 4 to 7.

(2) Color Balance

With respect to the images obtained above, a* and b* values in the L*a*b* color space prescribed by CIE were measured by means of Spectrolino (manufactured by Gretag Macbeth Co.) to plot the a* and b* values. The color balances of the image formed with the ink set of Example 15 and 16 and the respective images formed with the ink sets of Comparative Examples 4 to 7 were visually observed and compared with each other. As a result, the color balances of the respective images formed with the ink sets of Comparative Examples 4 to 7 locally contained portions where saturation was not attained (portions where the color balance was lost) compared with the color balance of the image formed with the ink set of Example 15 and 16.

<Combinations of Inks Constituting Ink Sets of Example 17 and Comparative Example 8>

Inks 18 to 26 obtained above were used according to combinations shown in Table 7 to provide ink sets of Example 17 and Comparative Example 8.

TABLE 7

| | Inks constituting ink sets | | | | | |
|---|---|---|---|---|---|---|
| | Blue ink | Green ink | Red ink | Yellow ink | Magenta ink | Cyan ink |
| Example 17 | Ink 18 | Ink 20 | Ink 22 | Ink 24 | Ink 25 | Ink 26 |
| Comp. Example 8 | Ink 19 | Ink 21 | Ink 23 | Ink 24 | Ink 25 | Ink 26 |

<Evaluation of Ink Sets of Example 17 and Comparative Example 8>

The respective inks constituting the ink sets of Example 17 and Comparative Example 8 were charged into ink cartridges, and the ink cartridges were installed in an ink jet recording apparatus "PIXUS 990i" (manufactured by Canon Inc.) that ejects an ink by an action of thermal energy and was modified so as to conduct one-direction recording. A color chart of ISO/JIS-SCID High-Definition Color Digital Standard Image was then recorded. Incidentally, recording conditions and a recording medium are as follows.

Recording Conditions

Kind of paper: Prophoto Paper

Printing quality: Beautiful

Color adjustment: Automatic.

Recording Medium

Professional Photo Paper PR-101 (product of Canon Inc.).

(1) Color Reproduction Range

With respect to the images obtained above, a* and b* values in the L*a*b* color space prescribed by CIE were measured by means of Spectrolino (manufactured by Gretag Macbeth Co.) to plot the a* and b* values. The image formed with the ink set of Example 17 was compared as to color area with the image formed with the ink set of Comparative Example 8. As a result, the area of the color space of the image formed with the ink set of Example 17 was far larger than the area of the color space of the image formed with the ink set of Comparative Example 8.

(2) Color Balance

With respect to the images obtained above, a* and b* values in the L*a*b* color space prescribed by CIE were measured by means of Spectrolino (manufactured by Gretag Macbeth Co.) to plot the a* and b* values. The color balances of the image formed with the ink set of Example 17 and the image formed with the ink set of Comparative Example 8 were visually observed and compared with each other. As a result, the color balance of the image formed with the ink set of Comparative Example 8 locally contained portions where saturation was not attained (portions where the color balance was lost) compared with the color balance of the image formed with the ink set of Example 17.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-038270, filed Feb. 15, 2006 and 2006-038271, filed Feb. 15, 2006, which are hereby incorporated by reference herein in their entirety.

What is claimed is:

1. An aqueous ink to be used in an ink jet recording comprising at least a green pigment having a copper phthalocyanine skeleton,
    wherein a proportion of the $K\alpha$-line intensity of a chlorine atom to the $K\alpha$-line intensity of a bromine atom obtained by subjecting the green pigment to X-ray fluorescence analysis is 3.3 or more to 10.0 or less.

2. The aqueous ink according to claim 1, which comprises a polymer having a weight average molecular weight ranging from 2,000 or more to 5,000 or less.

3. The aqueous ink according to claim 1, which comprises, as a water-soluble organic solvent, at least polyethylene glycol having a weight average molecular weight of 1,000 or more.

4. An ink set to be used in an ink jet recording comprising a combination of a plurality of aqueous inks that comprises at least a green ink, a red ink and a blue ink,
    wherein the green ink is the aqueous ink according to claim 1, a coloring material of the red ink is C.I. Pigment Red 149, and a coloring material of the blue ink is C.I. Pigment Violet 23.

5. An ink jet recording method comprising ejecting an ink by an ink jet recording method to conduct recording on a recording medium, wherein the ink is the aqueous ink according to claim 1.

6. An ink cartridge comprising an ink storage portion storing an ink, wherein the ink is the aqueous ink according to claim 1.

7. A recording unit comprising an ink storage portion storing an ink and a recording head for ejecting the ink, wherein the ink is the aqueous ink according to claim 1.

8. An ink jet recording apparatus comprising an ink storage portion storing an ink and a recording head for ejecting the ink, wherein the ink is the aqueous ink according to claim 1.

* * * * *

UNITED STATES PATENT AND TRADEMARK OFFICE
CERTIFICATE OF CORRECTION

PATENT NO. : 7,381,257 B2
APPLICATION NO. : 11/674344
DATED : June 3, 2008
INVENTOR(S) : Hideki Takayama et al.

It is certified that error appears in the above-identified patent and that said Letters Patent is hereby corrected as shown below:

COLUMN 1
Line 11, "relates" should read --relates to--.

COLUMN 6
Line 49, "above-describe" should read --above-described--.

COLUMN 7
Line 57, "may" should read --there may--.

COLUMN 9
Line 24, "time" (both occurrences) should read --times--.
Line 40, "time" should read --times--.

COLUMN 11
Line 56, "tens" should read --tens of--.

COLUMN 17
Line 13, "surfaces" should read --of surfaces--.

COLUMN 20
Line 46, "As" should read --as--.
Line 59, "As" should read --as--.

COLUMN 21
Line 24, "As" should read --as--.
Line 35, "As" should read --as--.

COLUMN 29
Line 29, "Example" should read --Examples--.
Line 33, "Example 15 to 16" should read --Examples 15 to 16--.
Line 46, "Example" should read --Examples--.
Line 48, "Example" should read --Examples--.

UNITED STATES PATENT AND TRADEMARK OFFICE
CERTIFICATE OF CORRECTION

PATENT NO. : 7,381,257 B2
APPLICATION NO. : 11/674344
DATED : June 3, 2008
INVENTOR(S) : Hideki Takayama et al.

It is certified that error appears in the above-identified patent and that said Letters Patent is hereby corrected as shown below:

COLUMN 30
Line 31, "Example" should read --Examples--.
Line 35, "Example" should read --Examples--.
Line 43, "Example" should read --Examples--.
Line 51, "Example" should read --Examples--.

Signed and Sealed this

Fourth Day of November, 2008

JON W. DUDAS
*Director of the United States Patent and Trademark Office*